(12) United States Patent
Nishikuma et al.

(10) Patent No.: US 11,081,945 B2
(45) Date of Patent: Aug. 3, 2021

(54) MANUFACTURING METHOD FOR STATOR COIL

(71) Applicant: TOYOTA JIDOSHA KABUSHIKI KAISHA, Toyota (JP)

(72) Inventors: Yasushi Nishikuma, Toyota (JP); Daisuke Mizushima, Toyota (JP); Yasuyuki Hirao, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 16/550,653

(22) Filed: Aug. 26, 2019

(65) Prior Publication Data

US 2020/0112238 A1   Apr. 9, 2020

(30) Foreign Application Priority Data

Oct. 5, 2018 (JP) .............................. JP2018-190152

(51) Int. Cl.
*H02K 15/00* (2006.01)
*H02K 15/06* (2006.01)
*B23P 19/02* (2006.01)
*H01R 43/20* (2006.01)

(52) U.S. Cl.
CPC ............ *H02K 15/064* (2013.01); *B23P 19/02* (2013.01); *H01R 43/20* (2013.01); *Y10T 29/49009* (2015.01)

(58) Field of Classification Search
CPC .......... H02K 3/12; H02K 15/026; H02K 1/26; H02K 3/02; H02K 3/48; H02K 15/065; H02K 15/067; H02K 15/085; Y10T 29/49009; Y10T 29/49073; Y10T 29/53143; Y10T 29/49071; Y10T 29/5317

USPC ........ 29/596, 598, 604, 605, 606, 609, 729, 29/732

See application file for complete search history.

(56) References Cited

U.S. PATENT DOCUMENTS 10,250,093 B2* 4/2019 Hattori ................... H02K 3/12
10,389,199 B2* 8/2019 Langlard .............. H02K 15/085
2019/0222087 A1 7/2019 Matsumoto et al.

FOREIGN PATENT DOCUMENTS

JP     2015-023771 A    2/2015
JP     2019-126153 A    7/2019
WO     2015/011542 A2   1/2015

* cited by examiner

*Primary Examiner* — Thiem D Phan
(74) *Attorney, Agent, or Firm* — Sughrue Mion, PLLC

(57) ABSTRACT

Provided is a manufacturing method for a stator coil in which end portions of one-side conductor segments inserted into slots from the side of one end in an axial direction of a stator core and end portions of other-side conductor segments are connected to each other through coupling members inside the slots. The method includes: pressing in the one-side conductor segment or the other-side conductor segment in an insertion direction in a state where the end portion of the one-side conductor segment or the end portion of the other-side conductor segment, or an end portion of the coupling member has been moved toward the inner circumferential side of the stator core; connecting the end portion of the one-side conductor segment and the end portion of the other-side conductor segment to each other; and executing the pressing in and the connecting sequentially from the outer circumferential side of the stator core.

5 Claims, 24 Drawing Sheets

SECTION A-A

SECTION A-A

MANUFACTURING METHOD FOR STATOR COIL

INCORPORATION BY REFERENCE

The disclosure of Japanese Patent Application No. 2018-190152 filed on Oct. 5, 2018 including the specification, drawings and abstract is incorporated herein by reference in its entirety.

BACKGROUND

1. Technical Field

The present disclosure relates to a manufacturing method for a stator coil, particularly to a method of manufacturing a stator coil by connecting end portions of conductor segments to each other inside slots of a stator core.

2. Description of Related Art

A stator of a rotating electrical machine typically has a stator coil wound around a stator core. A stator coil formed by coupling together a plurality of conductor segments is known. Japanese Patent Application Publication No. 2015-23771 (JP 2015-23771 A) proposes a method of manufacturing a stator coil by inserting substantially U-shaped conductor segments into slots from the sides of both ends in an axial direction of a stator core and joining together these conductor segments inside the slots.

In the manufacturing method described in JP 2015-23771 A, first, a bonding material containing conductive particles is applied to leading end surfaces of the conductor segments. Then, a plurality of conductor segments is inserted into a plurality of slots from one side, and a plurality of conductor segments is inserted into the slots also from the other side. The leading end surfaces of the conductor segments are pressed against each other and the bonding material is thereby heated to cure, so that the conductor segments are collectively connected to each other.

When end portions of a plurality of conductor segments are thus collectively assembled, the end portion of the conductor segment on one side and the end portion of the conductor segment on the other side may hit against each other, which results in an assembly failure.

SUMMARY

The present disclosure provides a manufacturing method for a stator coil in which end portions of conductor segments are connected to each other inside slots of a stator core, and which can reduce the assembly failure of the conductor segments.

A manufacturing method for a stator coil according to an aspect of the present disclosure is a manufacturing method in which end portions of one-side conductor segments that are inserted into slots from the side of one end in an axial direction of a stator core having a plurality of slots, and end portions of other-side conductor segments that are inserted into the slots from the side of the other end in the axial direction of the stator core, are connected to each other through coupling members inside the slots. The coupling members are mounted either to the end portions of the one-side conductor segments or to the end portions of the other-side conductor segments and inserted into the slots along with the end portions of the one-side conductor segments or the end portions of the other-side conductor segments. The manufacturing method includes: partially inserting the one-side conductor segments or the other-side conductor segments into the slots; after the inserting, pressing in the one-side conductor segment or the other-side conductor segment in an insertion direction in a state where the end portion of the one-side conductor segment or the end portion of the other-side conductor segment, or an end portion of the coupling member has been moved toward the inner circumferential side of the stator core; after the pressing in, connecting the end portion of the one-side conductor segment and the end portion of the other-side conductor segment to each other through the coupling member; and executing the pressing in and the connecting sequentially from the outer circumferential side of the stator core.

Thus, the conductor segment with the coupling member mounted at the leading end is pressed into the slot in a state of having been moved toward the inner circumferential side. This can reduce the likelihood that one conductor segment on the outer circumferential side that has already been assembled or the coupling member thereof, and the coupling member mounted at the leading end of another conductor segment to be assembled on the inner circumferential side of the one conductor segment, may hit against each other during pressing in. As a result, the assembly failure of the conductor segments can be reduced.

In the manufacturing method for a stator coil of the above aspect, the pressing in may be pressing in the one-side conductor segment or the other-side conductor segment in the insertion direction to a predetermined position. The connecting may be connecting the end portion of the one-side conductor segment and the end portion of the other-side conductor segment to each other through the coupling member by, after the pressing in, moving the one-side conductor segment or the other-side conductor segment in the insertion direction in a state where the end portion of the one-side conductor segment or the end portion of the other-side conductor segment, or the coupling member is guided by a jig in the axial direction, and plugging the end portion of the one-side conductor segment or the end portion of the other-side conductor segment into the coupling member.

In this configuration, a clearance between a press-in jig and a surface of one conductor segment on the outer circumferential side that has already been assembled or a surface of the coupling member thereof, or a clearance between the press-in jig and an inner surface of the slot can be used to guide the end portion of another conductor segment on the inner circumferential side to be assembled later or the coupling member thereof in the axial direction and plug the end portion of this conductor segment into the coupling member. This can reduce the likelihood that the coupling member or the end portion of the conductor segment may buckle during plugging. As a result, the assembly failure of the conductor segments can be reduced.

In the manufacturing method for a stator coil of the above aspect, the connecting may be connecting the end portion of the one-side conductor segment and the end portion of the other-side conductor segment to each other such that the coupling member and another coupling member adjacent to the coupling member in a radial direction are staggered in the axial direction.

Thus, even when the end portion of the conductor segment being connected and the end portion of another conductor segment on the inner circumferential side to be connected thereafter are pressed into the slot at the same time, the end portion of the conductor segment on the inner circumferential side to be connected later and the end portion of the conductor segment being connected are staggered. This allows the end portion of the conductor segment being connected to be always accessible from the inner circumferential side, without becoming covered with the conductor segment on the inner circumferential side. As a result, the assembly failure of the conductor segments can be reduced.

In the manufacturing method for a stator coil of the above aspect, the connecting may include forming a swaged connection at the end portion of the one-side conductor segment or the end portion of the other-side conductor segment by pressing the coupling member from the inner circumferential side toward the outer circumferential side of the stator core.

Thus, the conductor segment and the coupling member are connected to each other by swaging, so that the joint reliability of the conductor segments can be improved and the assembly failure of the conductor segments can be reduced.

In the manufacturing method for a stator coil of the above aspect, the end portion of the one-side conductor segment and the end portion of the other-side conductor segment may have a groove for swaged connection. The inserting may be inserting the end portions of the one-side conductor segments or the end portions of the other-side conductor segments into the slots such that the grooves face the inner circumferential side of the stator core. The connecting may include forming a swaged connection by plugging the end portion of the one-side conductor segment or the end portion of the other-side conductor segment into the coupling member and pressing a portion of the coupling member corresponding to the position of the groove from the inner circumferential side toward the outer circumferential side of the stator core so as to fit into the groove.

In this configuration, a swaged connection can be formed by pressing the coupling member on the inner circumferential side to be assembled later toward the outer circumferential side, against the surface of the conductor segment on the outer circumferential side that has already been assembled or the surface of the coupling member thereof. Thus, the joint reliability of the conductor segments can be further improved and the assembly failure of the conductor segment can be reduced.

The above-described aspects can reduce the assembly failure of the conductor segments in the manufacturing method for a stator coil in which the end portions of the conductor segments are connected to each other inside the slots of the stator core.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
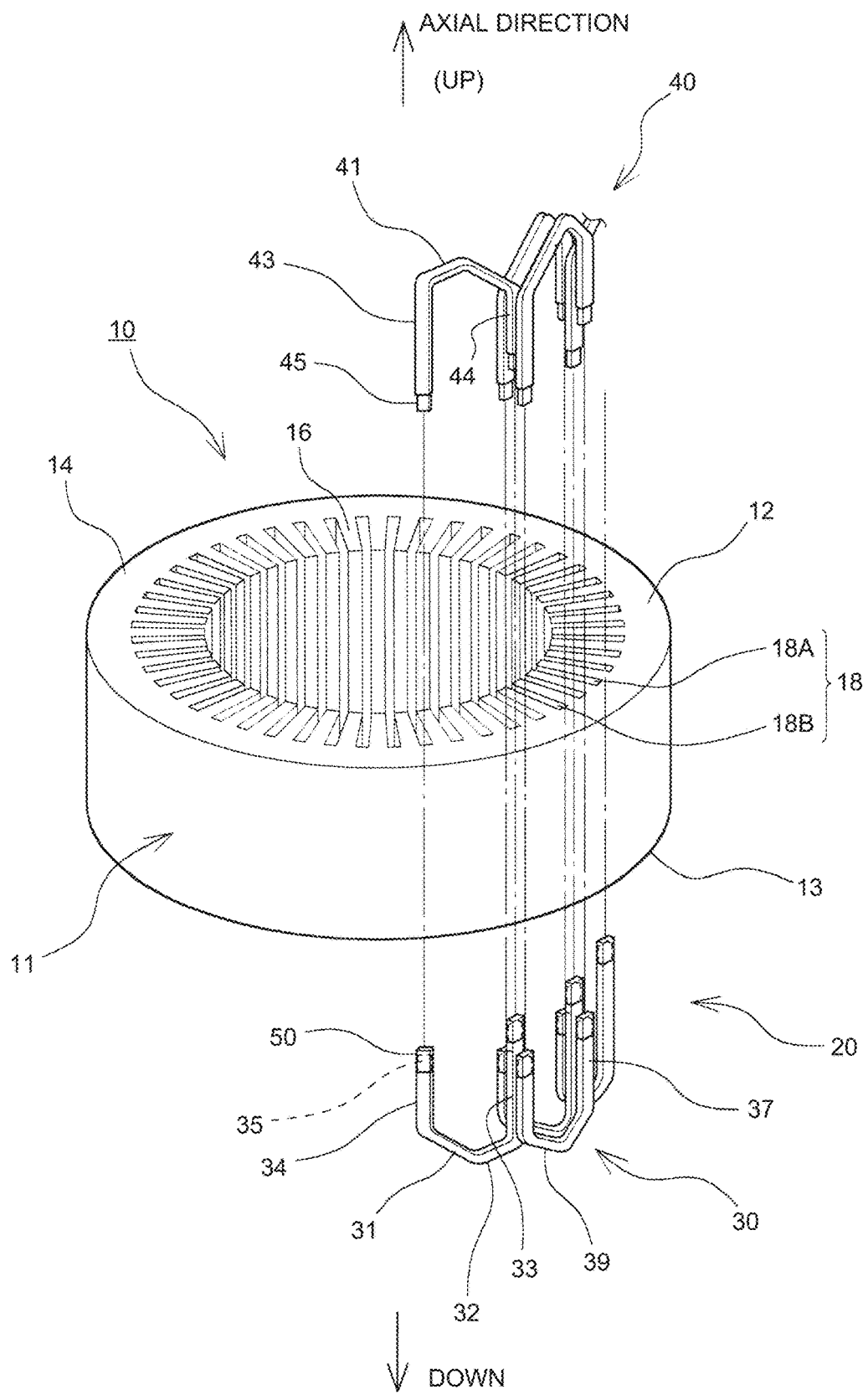
FIG. 1 is a perspective view showing a step of inserting conductor segments into slots of a stator core.

A manufacturing method for a stator coil 20 of an embodiment will be described below with reference to the drawings. As shown in FIG. 1, in the manufacturing method for the stator coil 20 of the embodiment, leading ends 45 of upper conductor segments 40 that are inserted into slots 18 from the side of an upper end surface 12 of a stator core 11, and leading ends 35 of lower conductor segments 30 that are inserted into the slots 18 from the side of a lower end surface 13 of the stator core 11, are connected to each other through coupling members 50 inside the slots 18. Although an actual stator 10 has a large number of upper conductor segments 40 and lower conductor segments 30, for clarity, only a few upper conductor segments 40 and lower conductor segments 30 are shown in FIG. 1. Here, the side of the upper end surface 12, the side of the lower end surface 13, the upper conductor segments 40, and the lower conductor segments 30 correspond respectively to the side of the one end in the axial direction, the side of the other end in the axial direction, the one-side conductor segments, and the other-side conductor segments described in claim 1.

The stator core 11 is composed of a substantially annular yoke 14 and a plurality of teeth 16 protruding from an inner circumferential surface of the yoke 14 toward a radially inner side. The slot 18 that is a space to house a portion of the stator coil 20 is formed between one tooth 16 and another tooth 16 adjacent to each other in a circumferential direction. For example, the stator core 11 may be a steel-sheet stack formed by stacking a plurality of magnetic steel sheets (e.g., silicon steel sheets) in a thickness direction, or a powder magnetic core formed by press-molding of magnetic particles coated with an insulating film.

The stator coil 20 is formed by connecting the upper conductor segments 40 and the lower conductor segments 30 to each other so as to be wound around the teeth 16 of the stator core 11. The aspects of connection and winding of the stator coil 20 can be selected as appropriate according to the specifications of the rotating electrical machine; the stator coil 20 may be wound either in distributed winding or in concentrated winding. Subsequently, this embodiment will be described based on the assumption that the stator coil 20 is wound around the teeth 16 in a distributed winding.

As shown in FIG. 1, the upper conductor segments 40 include a plurality of upper conductor segments 41 each formed in a substantially U-shape.

Figure 2:
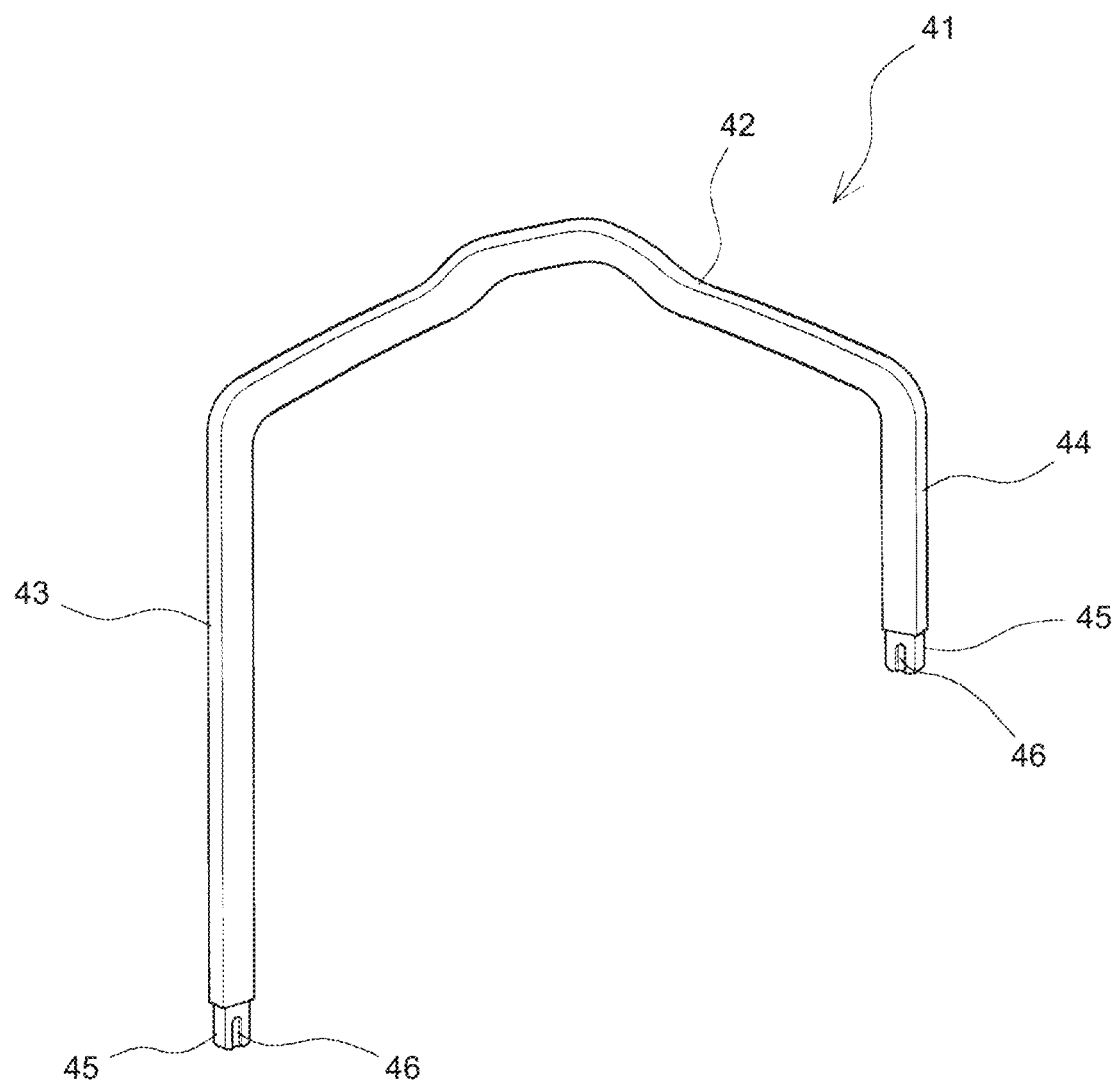
FIG. 2 is a perspective view of an upper conductor segment.

As shown in FIG. 2, the upper conductor segment 41 is formed by coating a surface of a rectangular wire made of a conductive material, such as copper, with an insulating film and bending this wire into a substantially U-shape. The upper conductor segment 41 is composed of a long leg 43 and a short leg 44 shorter than the long leg 43 that are parallel to each other, and a ridge-shaped connecting part 42 that connects the legs 43, 44 to each other. The leading ends 45 of end portions of the long leg 43 and the short leg 44 are stripped of the insulating film and have smaller external dimensions than the rest of the upper conductor segment 41 so as to be plugged into the coupling member 50. A groove 46 for swaged connection is formed in one surface of each leading end 45.

Figure 3:
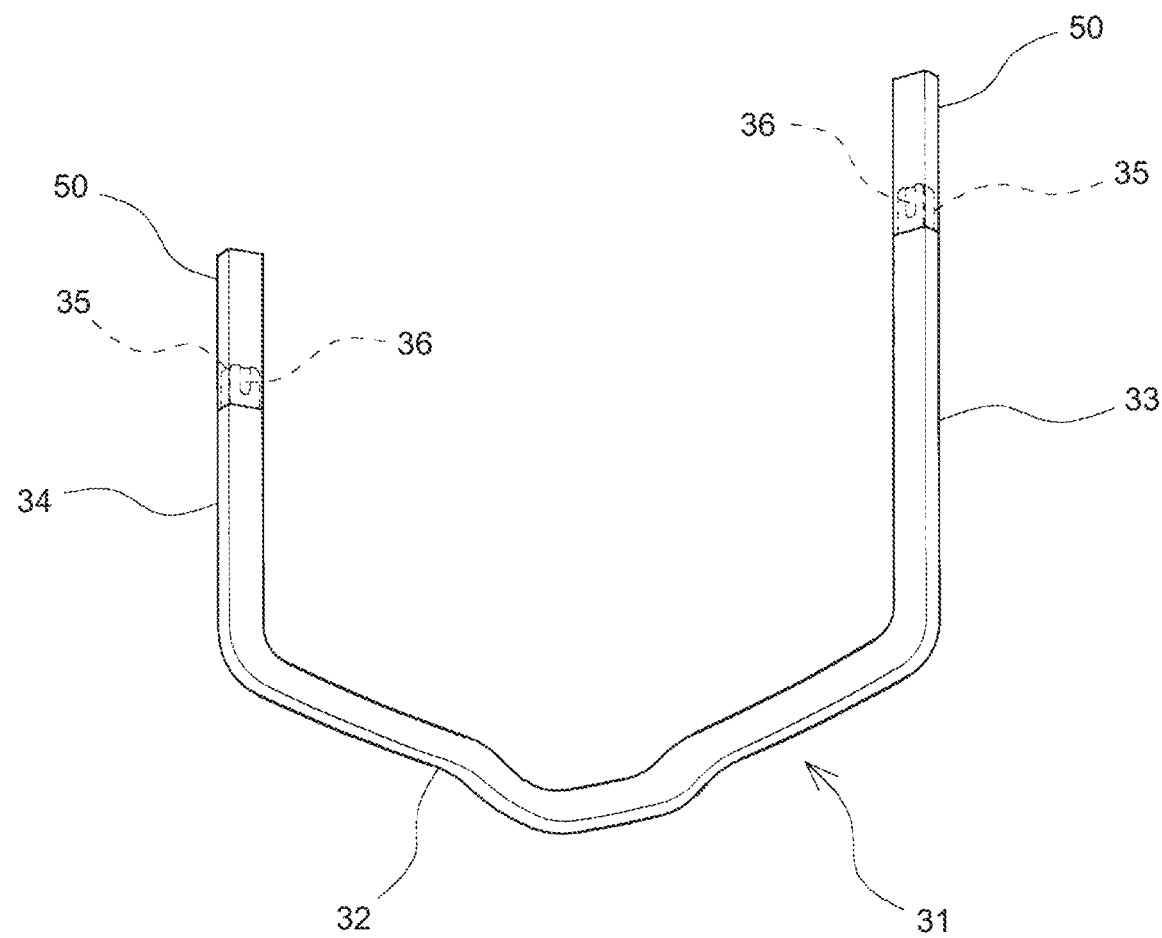
FIG. 3 is a perspective view of a lower conductor segment.

The lower conductor segments 30 include: a plurality of lower conductor segments 31 that is, like the upper conductor segment 41, formed by being bent into a substantially U-shape and has a long leg 33, a short leg 34, and a connecting part 32 as shown in FIG. 3; a lower conductor segment 39 that has two short legs 37 to be inserted into the slots 18, on an outermost circumferential side thereof, as shown in FIG. 1; and a lower conductor segment (not shown) that has two long legs 33 to be inserted into the slots 18, on an innermost circumferential side thereof.

As in the upper conductor segment 41, leading ends 35 of end portions of the long legs 33 and the short legs 34, 37 are stripped of an insulating film and have smaller external dimensions than the rest of the lower conductor segment. A groove 36 for swaged connection is formed in one surface of each leading end 35. The coupling member 50 is mounted on each leading end 35.

The long leg 43 and the short leg 44 of the upper conductor segment 41 are inserted into the slots 18 from the upper side and connected through the coupling members 50 to the short legs 34, 37 and the long leg 33 of the lower conductor segments 31, 39 inserted into the slots 18 from the lower side. The connecting parts 42, 32 protrude from the upper end surface 12 and the lower end surface 13 of the stator core 11 to form coil ends. Therefore, the lengths of the long legs 33, 43 and the short legs 34, 44 are such that the total of these lengths is substantially equal to the axial length of the slot 18. The long legs 33, 43 are longer than the short legs 34, 44 by the length of the coupling member 50. Thus, as shown in FIG. 1, the coupling members 50 adjacent to each other in a radial direction are disposed so as to be staggered in the axial direction.

Figure 4:
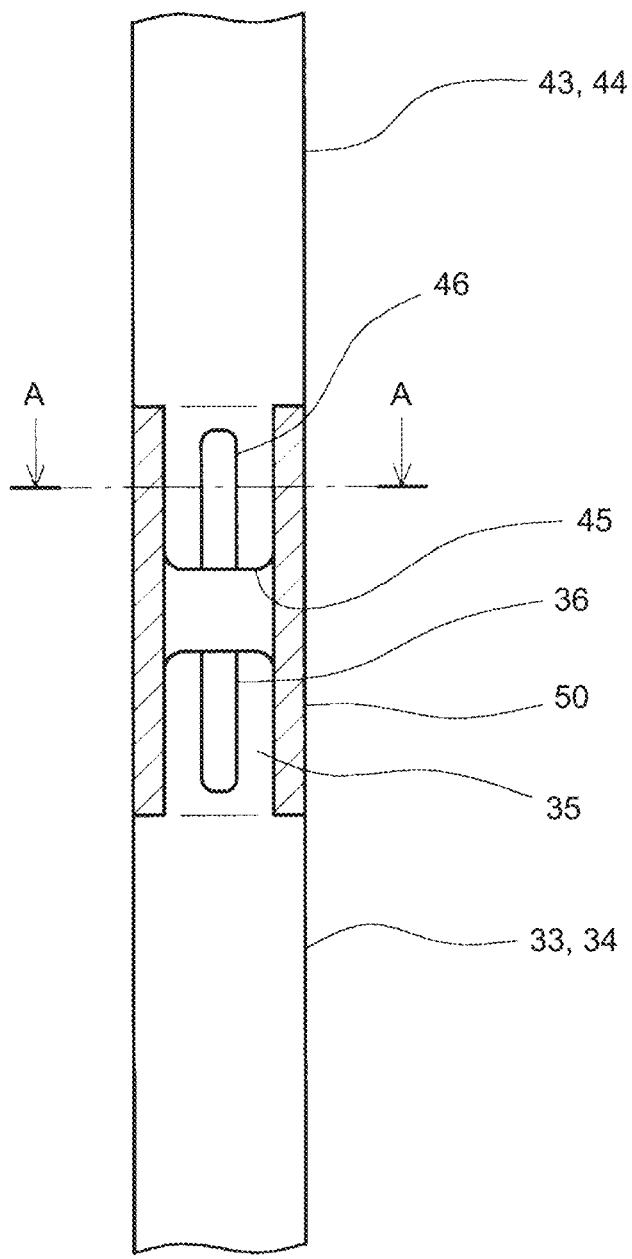
FIG. 4 is a sectional view of a portion at which the upper conductor segment and the lower conductor segment are connected to each other.

As shown in FIG. 4, the coupling member 50 is a rectangular tubular member made of a conductive material, such as copper. As in the conductor segments 30, 40, an outer surface of the coupling member 50 is coated with an insulating film. The dimensions of the inside diameters of the coupling member 50 are slightly smaller than the external dimensions of the leading ends 35, 45 of the conductor segments 30, 40. Thus, when the leading ends 35, 45 are plugged into the coupling members 50, the coupling members 50 fit on the leading ends. The external dimensions of the coupling member 50 are substantially equal to the external dimensions of the conductor segments 30, 40. Thus, when the leading ends 35, 45 are inserted into the coupling members 50, the outer surfaces of the coupling members 50 and outer surfaces of the legs 33, 34, 37, 43, 44 of the conductor segments 30, 40 become substantially flush with each other.

Figure 5:
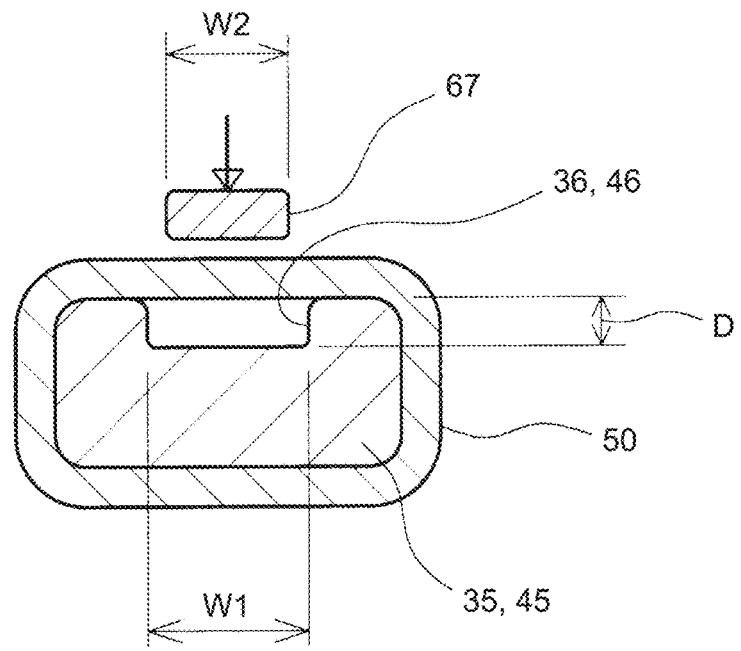
FIG. 5 is a sectional view taken along line A-A of FIG. 4, showing the conductor segment and a coupling member before swaging.

As shown in FIG. 5, in a state where the leading ends 35, 45 are inserted into the coupling members 50, a clearance is left between the grooves 36, 46 for swaged connection formed in the leading ends 35, 45 and inner surfaces of the coupling members 50. The grooves 36, 46 for swaged connection have a width W1 and a depth D. When portions of the outer surfaces of the coupling members 50 corresponding to the positions of the grooves 36, 46 are pressed with punches 67, having a width W2, of a swaging jig 65 shown in FIG. 8, these portions of the coupling members 50 corresponding to the positions of the grooves 36, 46 enter the grooves 36, 46. Thus, the coupling members 50 fasten the outer surfaces of the leading ends 35, 45, so that the leading ends 35, 45 and the coupling members 50 are firmly joined together.

Figure 7:
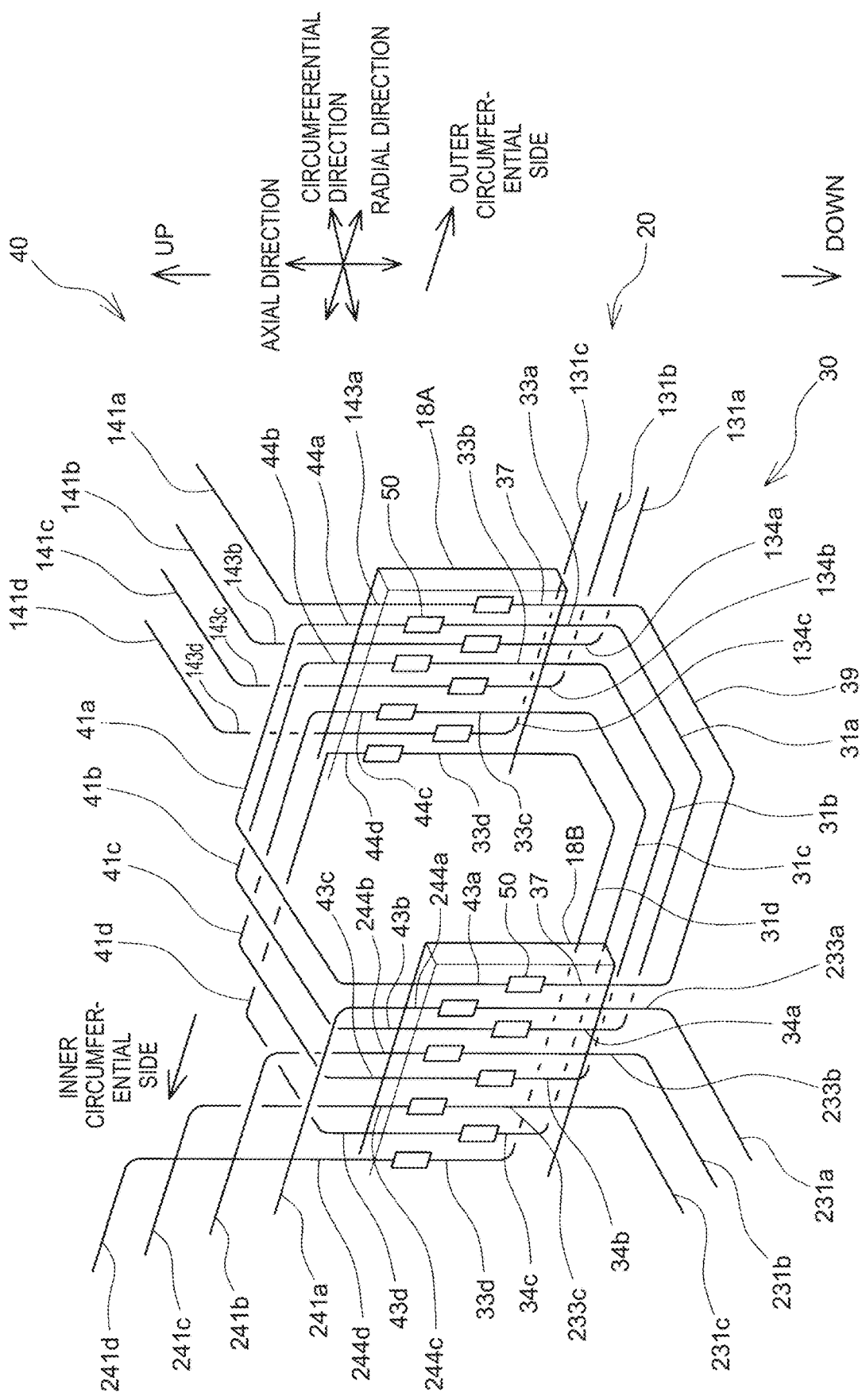
FIG. 7 is a perspective view showing how conductor segments are connected to each other.

Next, connection of the conductor segments 30, 40 will be described with reference to FIG. 7. FIG. 7 is a view showing the conductor segments 30, 40 inserted into two slots 18A, 18B that are separated from each other in the circumferential direction as shown in FIG. 1, and how these conductor segments are connected to each other. In FIG. 7, the conductor segments are distinguished from one another as follows: conductor segments of which the long legs 33, 43 and the short legs 34, 44 are respectively inserted into the two slots 18A, 18B are denoted by reference numbers in the 30s and 40s; conductor segments of which either the long legs 33, 43 or the short legs 34, 44 are inserted into the slot 18A are denoted by reference numbers in the 130s and 140s; and conductor segments of which either the long legs 33, 43 or the short legs 34, 44 are inserted into the slot 18B are denoted by reference signs in the 230s and 240s. In the following description, the number of turns of the stator coil 20 is counted from the outer circumferential side toward the inner circumferential side of the slots 18A, 18B. Accordingly, the conductor segment on the outermost circumferential side is a conductor segment forming the first turn, and the conductor segment on the innermost circumferential side is a conductor segment forming the eighth turn. To further distinguish the conductor segments from one another, signs a to d are added to the reference numbers sequentially from the outer circumferential side toward the inner circumferential side. Subsequently, the embodiment will be described based on the assumption that the lower conductor segment 39 inserted into the slots 18A, 18B, on the outermost circumferential side thereof, has two short legs 37, and that a lower conductor segment 31d inserted on the innermost circumferential side has two long legs 33d.

As shown in FIG. 7, the short legs 37 of the lower conductor segment 39 are inserted from the lower side into the slot 18A and the slot 18B, on the outermost circumferential side thereof. A long leg 143a of an upper conductor segment 141a is inserted from the upper side into the slot 18A, on the outermost circumferential side thereof, and is connected to the short leg 37 of the lower conductor segment 39 through the coupling member 50 inside the slot 18A.

A long leg 43a of an upper conductor segment 41a is inserted from the upper side into the slot 18B, on the outermost circumferential side thereof, and is connected to the short leg 37 of the lower conductor segment 39 through the coupling member 50 inside the slot 18B. The short legs 37 of the lower conductor segment 39, the long leg 143a of the upper conductor segment 141a, and the long leg 43a of the upper conductor segment 41a form the first turn in the slots 18A, 18B.

A short leg 44a of the upper conductor segment 41a is inserted from the upper side into the slot 18A so as to be located on the inner circumferential side of and adjacent to the long leg 143a of the upper conductor segment 141a. On the inner circumferential side of the short leg 37 of the lower conductor segment 39, a long leg 33a of a lower conductor segment 31a is inserted from the lower side into the slot 18A and connected to the short leg 44a of the upper conductor segment 41a through the coupling member 50 inside the slot 18A.

For a second place from the outer circumferential side of the slot 18B, a short leg 244a of an upper conductor segment 241a is inserted from the upper side, while a long leg 233a of a lower conductor segment 231a is inserted from the lower side, and the short leg 244a and the long leg 233a are connected to each other through the coupling member 50 inside the slot 18B.

The short leg 44a of the upper conductor segment 41a, the long leg 33a of the lower conductor segment 31a, the short leg 244a of the upper conductor segment 241a, and the long leg 233a of the lower conductor segment 231a form the second turn.

A short leg 34a of the lower conductor segment 31a is inserted into the slot 18B, on the inner circumferential side of the long leg 233a of the lower conductor segment 231a, and is connected through the coupling member 50 to a long leg 43b of an upper conductor segment 41b that is inserted on the inner circumferential side of the short leg 244a of the upper conductor segment 241a. A long leg 143b of an upper conductor segment 141b is inserted from the upper side into the slot 18A, on the inner circumferential side of the short leg 44a of the upper conductor segment 41a, and a short leg 134a of a lower conductor segment 131a is inserted on the inner circumferential side of the long leg 33a of the lower conductor segment 31a and connected to the long leg 143b through the coupling member 50. The short leg 34a of the lower conductor segment 31a, the long leg 43b of the upper conductor segment 41b, the long leg 143b of the upper conductor segment 141b, and the short leg 134a of the lower conductor segment 131a form the third turn.

In this way, the short legs 44a to 44d of the upper conductor segments 41a to 41d and the long legs 143a to 143d of the upper conductor segments 141a to 141d are inserted from the upper side into the slot 18A, alternately in the radial direction. The short leg 37 of the lower conductor segment 39 is inserted from the lower side into the slot 18A, on the outermost circumferential side of the lower side of the slot 18A, and the long legs 33a to 33d of the lower conductor segments 31a to 31d and the short legs 134a to 134c of the lower conductor segments 131a to 131c are inserted from the lower side into the slot 18A, on the inner circumferential side of the short leg 37, alternately in the radial direction.

The long legs 43a to 43d of the upper conductor segments 41a to 41d and the short legs 244a to 244d of the upper conductor segments 241a to 241d are inserted from the upper side into the slot 18B, alternately in the radial direction. The short leg 37 of the lower conductor segment 39 is inserted from the lower side into the slot 18B, on the outermost circumferential side of the lower side of the slot 18B, and the long legs 233a to 233c of the lower conductor segments 231a to 231c and the short legs 34a to 34c of the lower conductor segments 31a to 31c are inserted into the slot 18B, on the inner circumferential side of the short leg 37, alternately in the radial direction. The long leg 33d of the lower conductor segment 31d is inserted from the lower side into the slot 18B, on the innermost circumferential side of the lower side of the slot 18B.

In this way, the long legs and the short legs are disposed alternately in the radial direction. Since the long legs 33, 43 are longer than the short legs 34, 44 by the length of the coupling member 50 as described above, the coupling members 50 adjacent to each other in the radial direction are all disposed so as to be staggered in the axial direction as shown in FIG. 7.

Next, a manufacturing process of the stator coil 20 that is formed by connecting the conductor segments to each other as shown in FIG. 7 will be described with reference to FIG. 8 to FIG. 25. FIG. 8 to FIG. 25 show how the conductor segments are inserted at the same time into the slots 18A, 18B described above with reference to FIG. 7.

Figure 8:
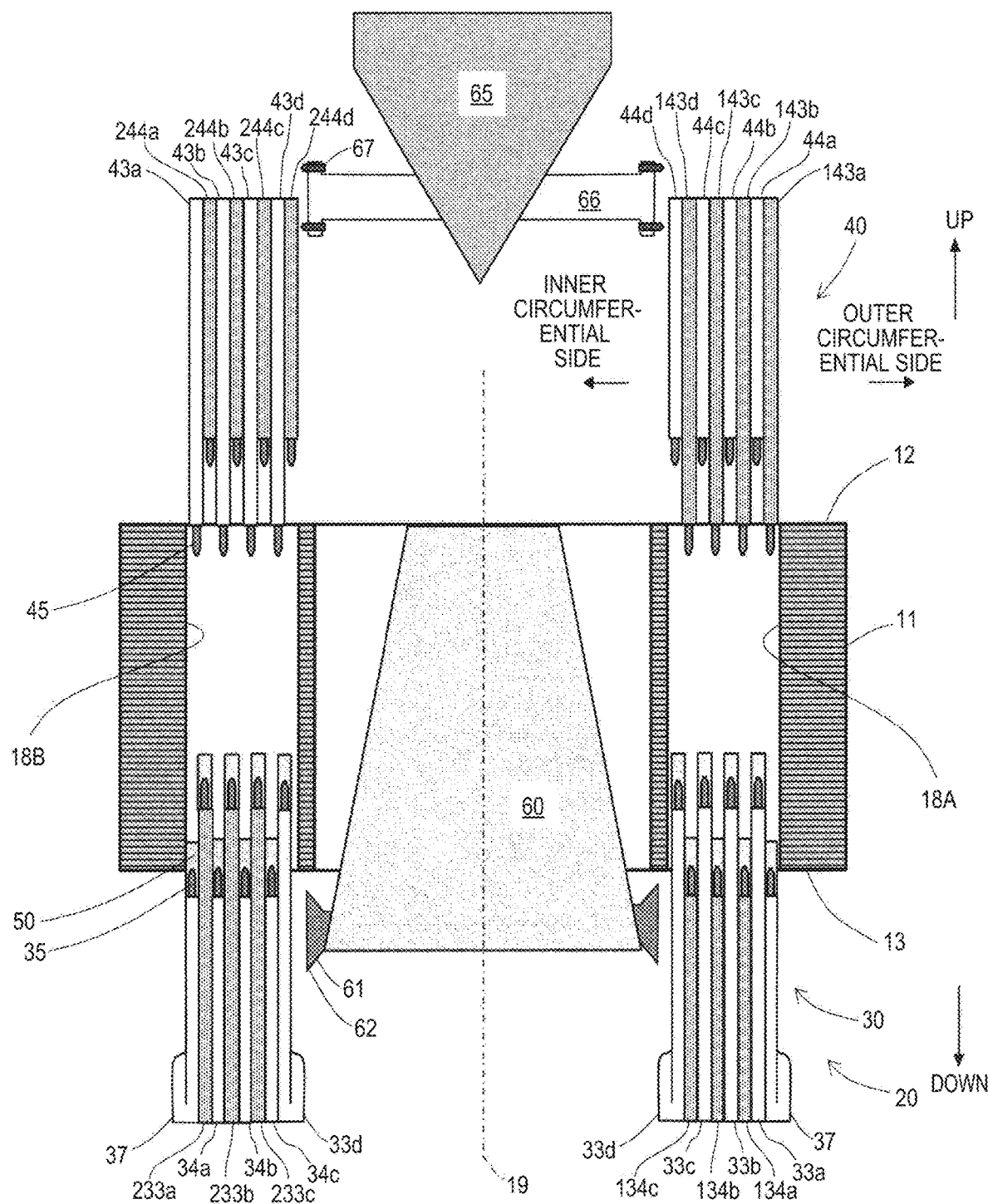
FIG. 8 is a view showing a state where the lower conductor segments and the upper conductor segments are partially inserted into the slots in a manufacturing process of a stator coil.

A press-in jig 60 shown in FIG. 8 has arms 61 that can be moved in and out in the radial directions, and the press-in jig 60 can move in an up-down direction along a central axis 19 of the stator core 11. A hook 62 extending upward and downward is provided at a leading end of each arm 61. The conductor segments 30, 40 can be moved toward the inner circumferential side, with the hooks 62 catching the leading ends 35, 45 of the conductor segments 30, 40 or the leading ends of the coupling members 50. The press-in jig 60 can guide the movement of the conductor segments 30, 40 in the axial direction by using radially outer-side portions of the arms 61.

The swaging jig 65 shown in FIG. 8 includes arms 66 that can be moved in and out in the radial directions, and the swaging jig 65 can move in the up-down direction along the central axis 19 of the stator core 11. The punch 67 that performs swaging is mounted at a leading end of each arm 66.

The subsequent description is based on the assumption that a controller (not shown) moves the conductor segments 30, 40 and operates the press-in jig 60 and the swaging jig 65. However, the present disclosure is not limited to this example, and an operator may manually move the conductor segments 30, 40 or operate the jigs 60, 65.

FIG. 8 shows a state upon completion of an inserting step in which the upper conductor segments 40 and the lower conductor segments 30 are arranged in the order of connection described with reference to FIG. 7 and the conductor segments 30, 40 are partially inserted into the slots 18A, 18B from the sides of the leading ends 35, 45. As described above with reference to FIG. 7, on the upper side of the slot 18A, the short legs 44a to 44d of the upper conductor segments 41a to 41d and the long legs 143a to 143d of the upper conductor segments 141a to 141d are disposed alternately in the radial direction. Similarly, on the upper side of the slot 18B, the long legs 43a to 43d of the upper conductor segments 41a to 41d and the short legs 244a to 244d of the upper conductor segments 241a to 241d are disposed alternately in the radial direction. On the lower side of the slot 18A, the short leg 37 of the lower conductor segment 39 is disposed on the outermost circumferential side, and the long legs 33a to 33d of the lower conductor segments 31a to 31d and the short legs 134a to 134c of the lower conductor segments 131a to 131c are disposed alternately in the radial direction. On the lower side of the slot 18B, the short leg 37 of the lower conductor segment 39 is disposed on the outermost circumferential side, and the long legs 233a to 233c of the lower conductor segments 231a to 231c and the short legs 34a to 34c of the lower conductor segments 31a to 31c are disposed on the inner circumferential side of the short leg 37, alternately in the radial direction. The long leg 33d of the lower conductor segment 31d is disposed on the innermost circumferential side of the lower side of the slot 18B. In the state shown in FIG. 8, the conductor segments 30, 40 are disposed such that the grooves 36, 46 for swaged connection provided at the leading ends 35, 45 of the conductor segments 30, 40 face the inner circumferential side.

As shown in FIG. 8, eight conductor segments are inserted from each of the upper and lower sides into the slots 18A, 18B. These conductor segments respectively form the first to eighth turns of the stator coil 20 from the outer circumferential side toward the inner circumferential side.

Figure 9:
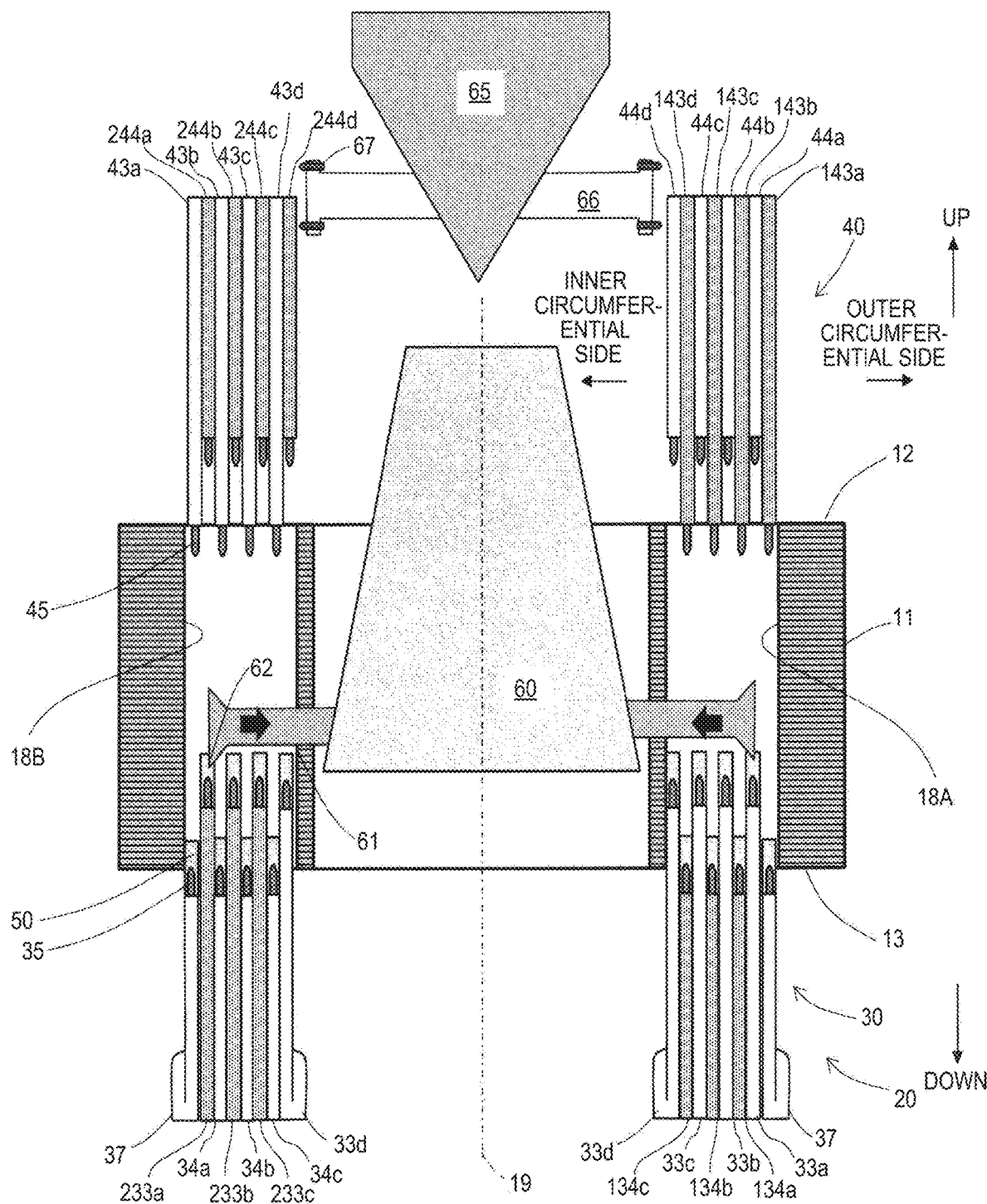
FIG. 9 is a view showing a step in the manufacturing process of the stator coil in which the lower conductor segments of second to eighth turns are moved toward an inner circumferential side, with a jig catching a leading end of the coupling member mounted on an end portion of the lower conductor segment of the second turn.

As shown in FIG. 9, the controller raises the press-in jig 60 to the inner circumferential side of the stator core 11 and extends the arms 61 in the radial directions. Then, the controller moves the conductor segments 30, 40 forming the second to eighth turns toward the inner circumferential side, as indicated by the thick black arrows in FIG. 9, with the hooks 62 on the lower side of the leading ends of the arms 61 catching the leading ends of the coupling members 50 that are mounted at the leading ends 35 of the long legs 33a, 233a of the lower conductor segments 31a, 231a of the second turn inserted from the lower side into the slots 18A, 18B. Thus, a slight clearance is created between the short legs 37 of the lower conductor segment 39 inserted from the lower side into the slots 18A, 18B, on the outermost circumferential side thereof, and the long legs 33a, 233a.

Figure 10:
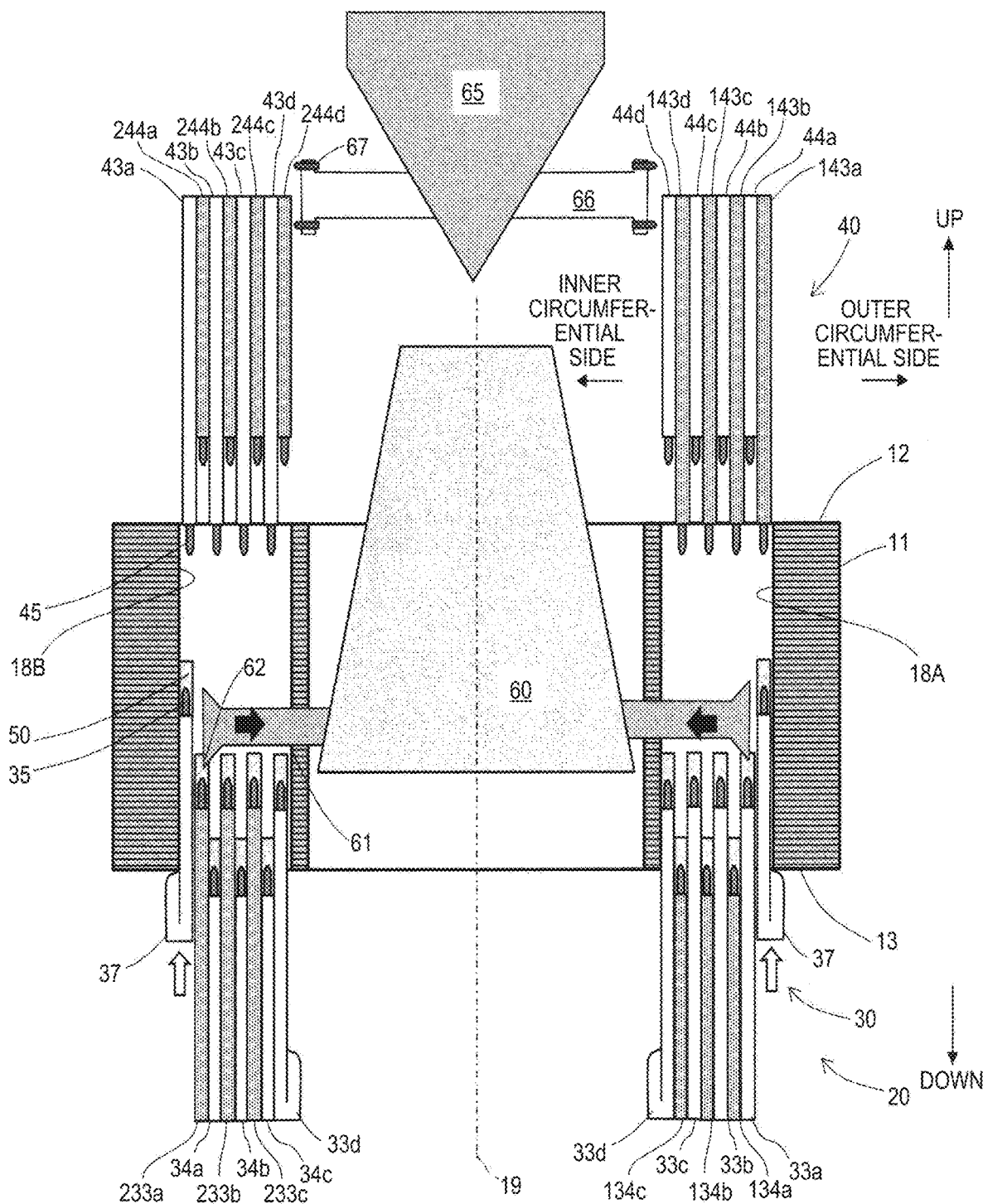
FIG. 10 is a view showing a step in the manufacturing process of the stator coil in which the lower conductor segment of a first turn is pressed in in an upward direction.

As shown in FIG. 10, while maintaining this state, the controller presses in the lower conductor segment 39 forming the first turn in the upward direction that is an insertion direction to a predetermined assembly position (pressing-in step). Since the conductor segments 30, 40 forming the second to eighth turns have been moved toward the inner circumferential side, it is unlikely that the leading ends of the coupling members 50 mounted at the leading ends 35 of the short legs 37 of the lower conductor segment 39 hit against lower end surfaces of the coupling members 50 mounted at the leading ends 35 of the long legs 33a, 233a of the lower conductor segments 31a, 231a forming the second turn. Thus, the controller can smoothly press in the short legs 37 of the lower conductor segment 39 to the predetermined assembly position.

In this case, since the two short legs 37 of the lower conductor segment 39 are connected to each other through the connecting part 32 into a U-shape, the two short legs 37 of the lower conductor segment 39 inserted into the slots 18A, 18B move upward at the same time.

Thus, it is possible to reduce the likelihood that the conductor segments 30, 40 on the outer circumferential side that have already been assembled or the coupling members 50 thereof, and the coupling members 50 mounted at the leading ends 35, 45 of the conductor segments 30, 40 to be assembled on the inner circumferential side of the already assembled conductor segments 30, 40, may hit against each other during the pressing in of the conductor segments 30, 40. As a result, the assembly failure of the conductor segments 30, 40 can be reduced.

Figure 11:
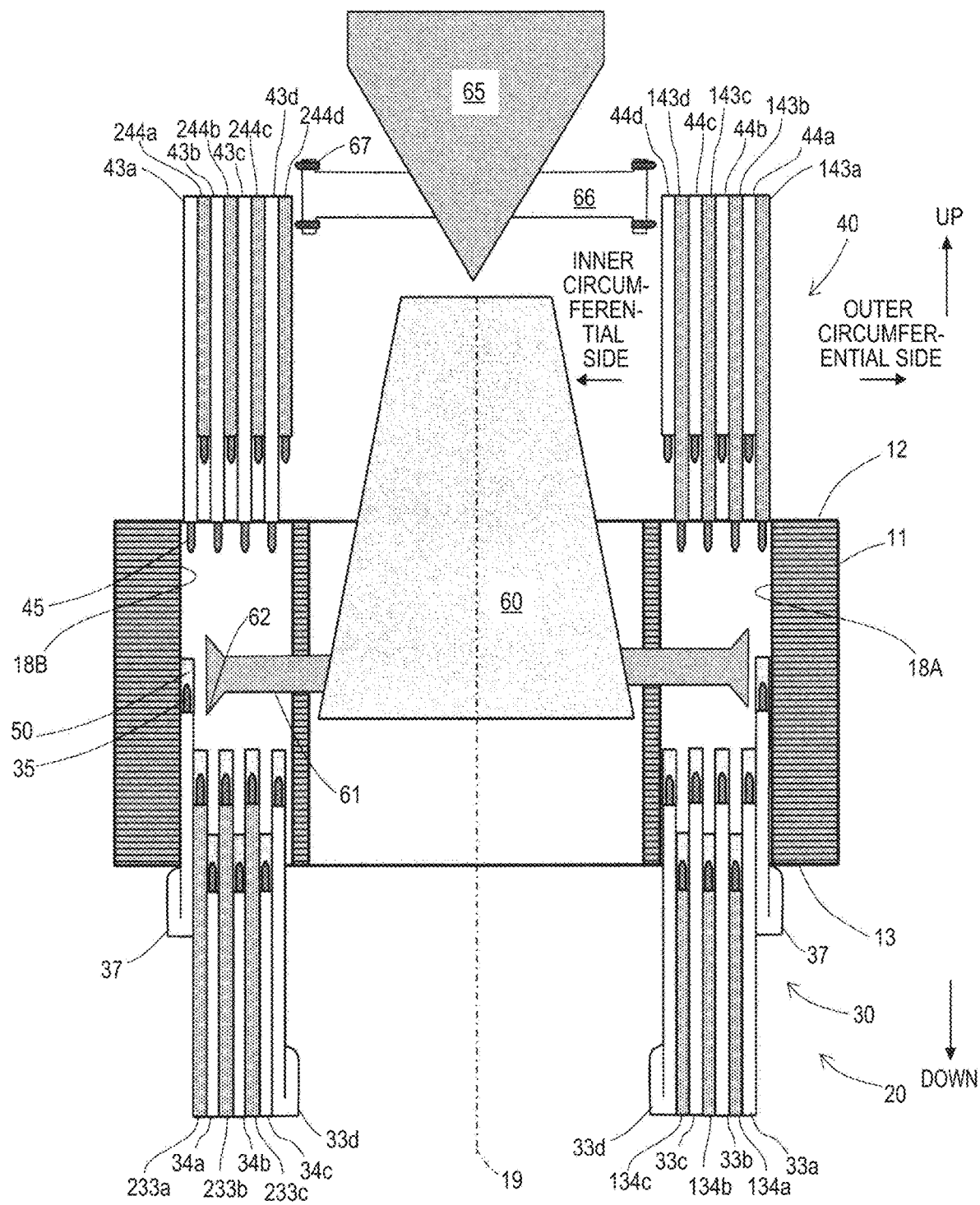
FIG. 11 is a view showing a step in the manufacturing process of the stator coil in which the lower conductor segment of the first turn is pressed in to a predetermined position.

As shown in FIG. 11, when the short legs 37 of the lower conductor segment 39 have been pressed in to the predetermined assembly position, the controller moves the press-in jig 60 upward to disengage the hooks 62 and the coupling members 50 from each other. Thus, the conductor segments 30, 40 forming the second to eighth turns return to the original positions by moving a little toward the radially outer side.

Figure 12:
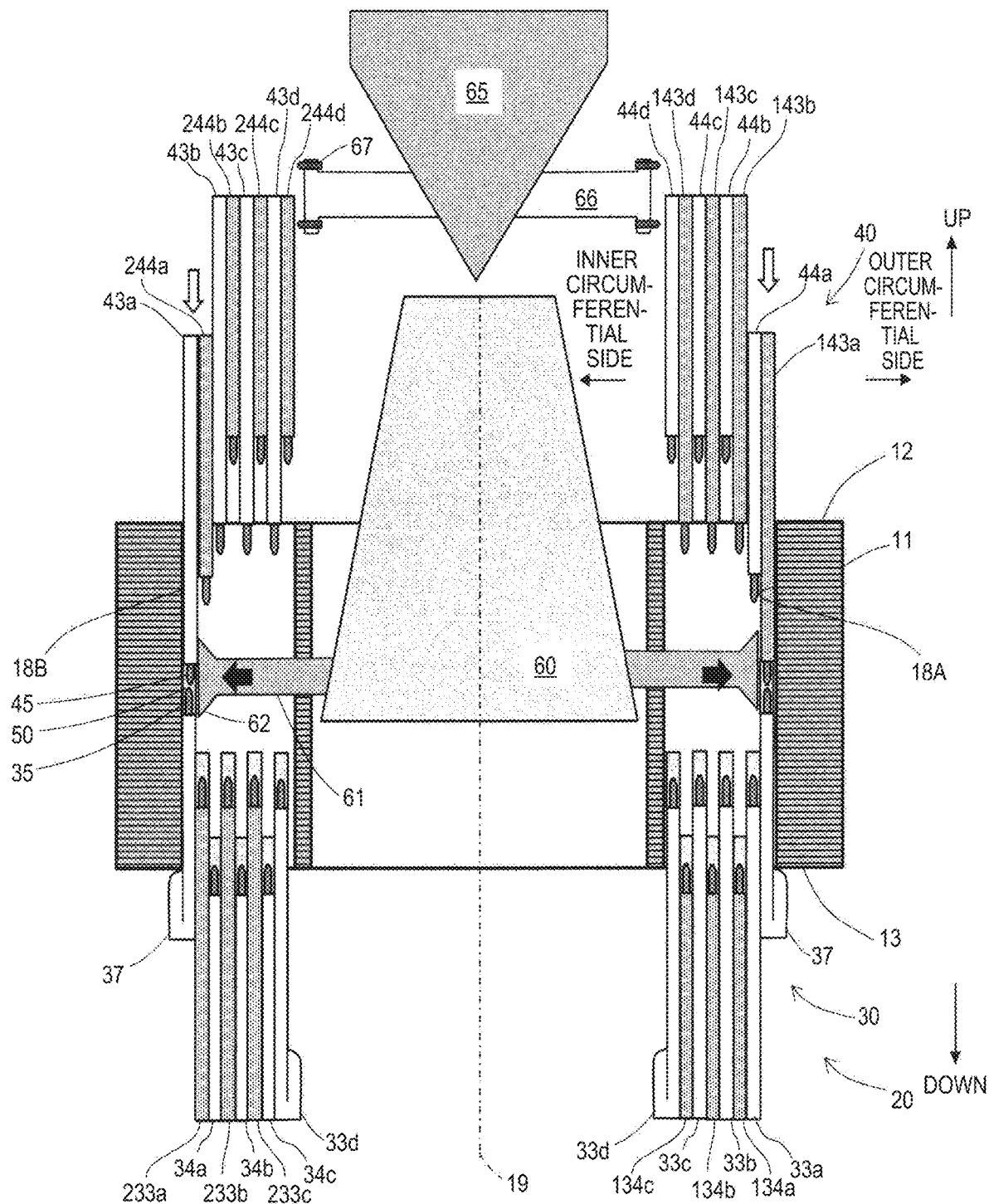
FIG. 12 is a view showing a step in the manufacturing process of the stator coil in which an end portion of the upper conductor segment of the first turn is plugged into the coupling member.

As shown in FIG. 12, the controller adjusts the levels of the arms 61 of the press-in jig 60 in the up-down direction so as to match the positions of the coupling members 50 that respectively connect the long legs 43a, 143a to the short legs 37, and then extends the arms 61 toward the radially outer sides to thereby create clearances for guiding the long legs 43a, 143a of the upper conductor segments 41a, 141a in the axial direction between inner surfaces of the slots 18A, 18B and the leading ends of the arms 61. Then, the controller moves downward the long leg 43a of the upper conductor segment 41a and the long leg 143a of the upper conductor segment 141a from the upper side to plug the leading ends 45 of the long legs 43a, 143a into the coupling members 50.

As described above, the internal dimensions of the coupling member 50 are slightly smaller than the external dimensions of the leading end 45, and therefore the leading end 45 and the coupling member 50 fit each other when the leading end 45 is plugged into the coupling member 50. This means that the leading ends 45 of the long legs 43a, 143a may buckle under a reaction force in a longitudinal direction while being plugged. In the manufacturing method of this embodiment, however, the long legs 43a, 143a are guided in the axial direction by the leading ends of the arms 61 and the inner surfaces of the slots 18A, 18B while being plugged, which can reduce the likelihood that the long legs 43a, 143a may buckle during plugging (plugging step and connecting step).

When the long leg 43a of the upper conductor segment 41a forming the second turn is moved downward, the short leg 44a of the upper conductor segment 41a that is connected to the long leg 43a in a U-shape and forms the third turn moves downward along with the long leg 43a. The short leg 244a of the upper conductor segment 241a forming the third turn also moves downward along with the long leg 43a and the short leg 44a.

Figure 6:
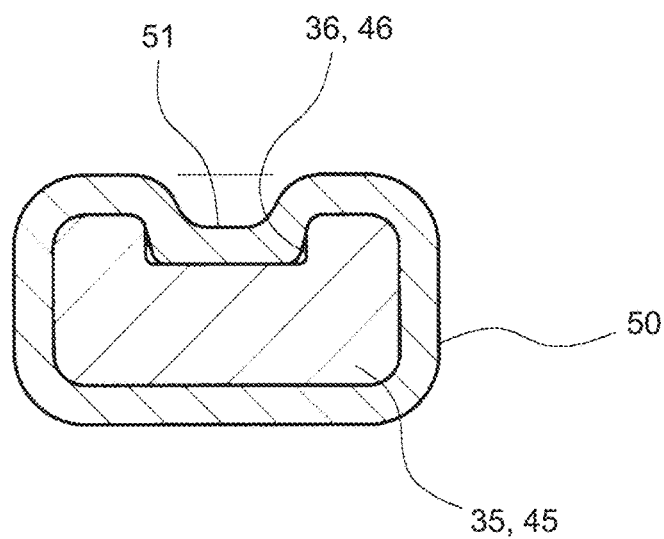
FIG. 6 is a sectional view taken along line A-A of FIG. 4, showing the conductor segment and the coupling member after swaging.
Figure 13:
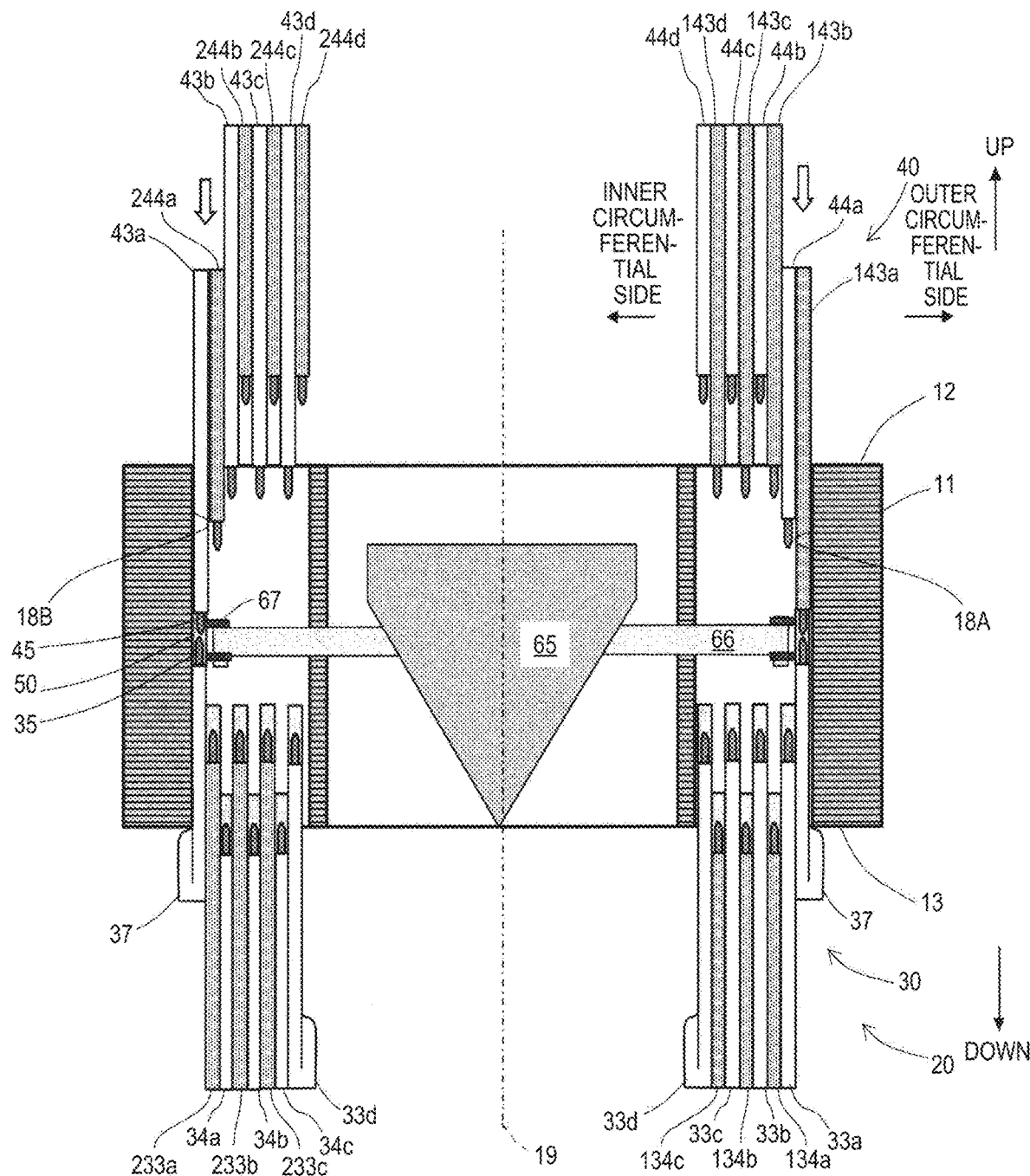
FIG. 13 is a view showing a step in the manufacturing process of the stator coil in which the coupling member of the first turn is swaged by a swaging jig.

As shown in FIG. 13, the controller lowers the swaging jig 65 and extends the arms 66 in the radial directions, and presses, by the punches 67 at the leading ends of the arms 66, portions of the outer surfaces of the coupling members 50 corresponding to the grooves 46 at the leading ends 45 to form a swaged connection as described above with reference to FIG. 6 and FIG. 7 (connecting step). In this case, outer circumferential-side surfaces of the coupling members 50 are retained in the radial direction by the inner surfaces of the slots 18A, 18B. Thus, the leading ends 35, 45 are connected to each other through the coupling members 50 by swaging, so that the joint reliability of the conductor segments 30, 40 can be improved and the assembly failure of the conductor segments 30, 40 can be reduced.

Figure 14:
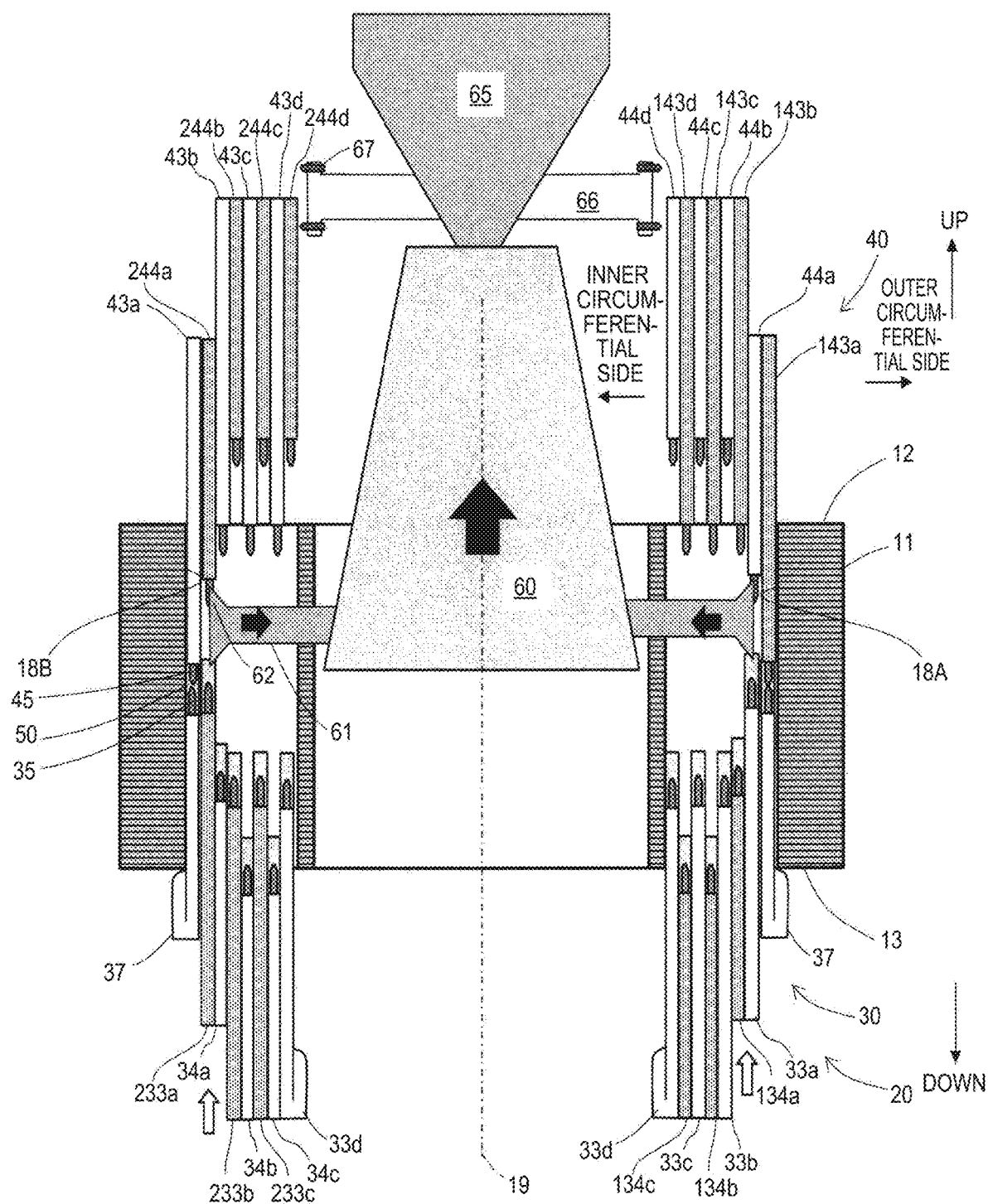
FIG. 14 is a view showing a step in the manufacturing process of the stator coil in which the lower conductor segment of the second turn is pressed in while being moved toward the inner circumferential side, with the jig catching the leading end of the coupling member mounted on the end portion of the lower conductor segment of the second turn.

As shown in FIG. 14, the controller moves the lower conductor segments 31a, 231a forming the second turn toward the inner circumferential side, with the hooks 62 at the leading ends of the arms 61 of the press-in jig 60 catching upper end portions of the coupling members 50 that are mounted at the leading ends 35 of the long legs 33a, 233a of the lower conductor segments 31a, 231a. Then, while maintaining this state, the controller moves upward the lower conductor segments 31a, 231a and the press-in jig 60.

Figure 15:
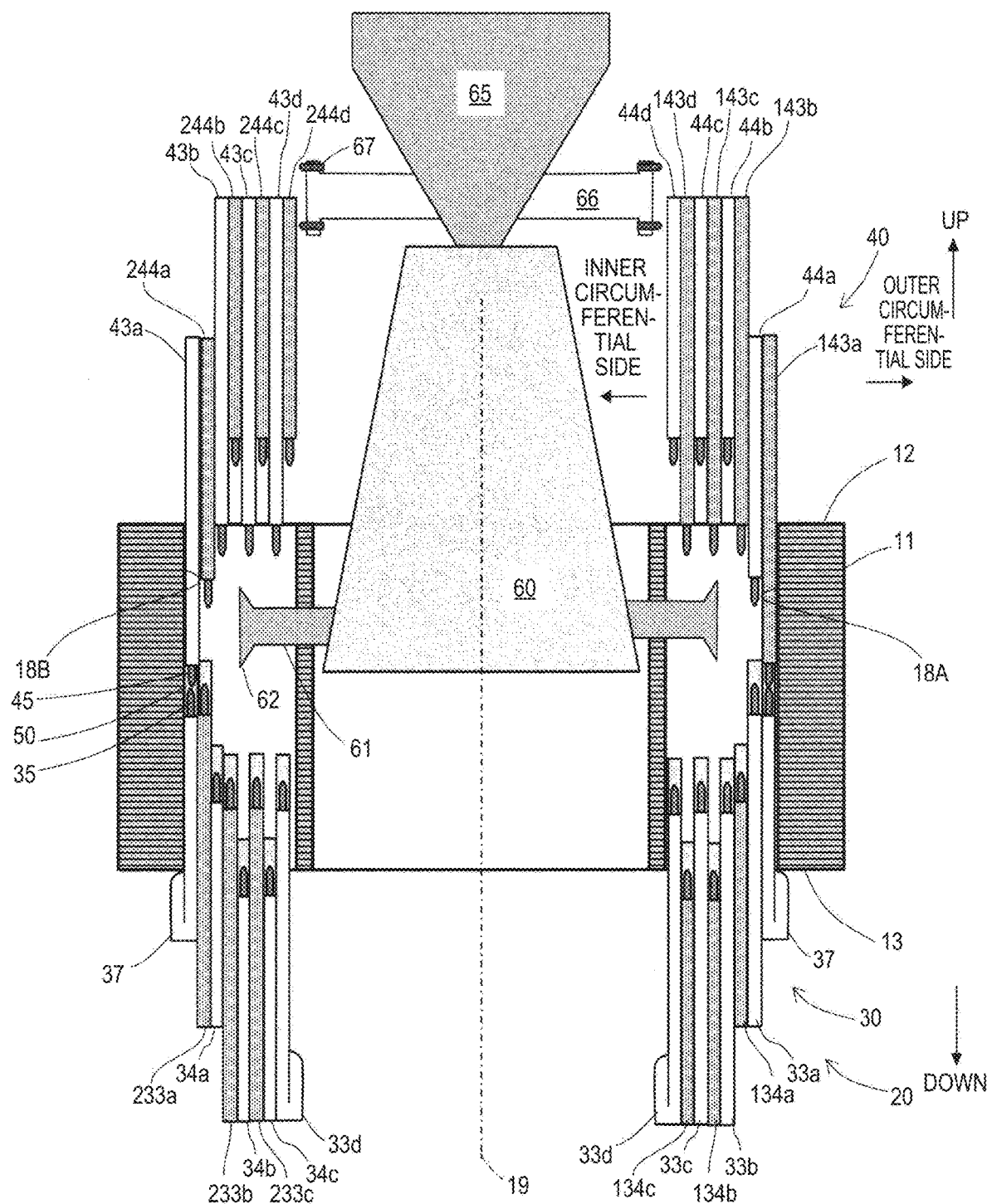
FIG. 15 is a view showing a state where the leading end of the lower conductor segment of the second turn has been plugged to a point above an upper end of the coupling member of the first turn in the manufacturing process of the stator coil.

As shown in FIG. 15, when the upper ends of the coupling members 50 of the lower conductor segments 31a, 231a have moved to side surfaces of the long legs 43a, 143a of the upper conductor segments 41a, 141a located on the outer circumferential side of and adjacent to the lower conductor segments 31a, 231a, the controller shortens the arms 61 of the press-in jig 60 in the radial directions. Thus, it is possible to reduce the likelihood that the coupling members 50 of the lower conductor segments 31a, 231a may hit against the lower end surfaces of the coupling members 50 of the upper conductor segments 41a, 141a, and to thereby reduce the assembly failure.

Figure 16:
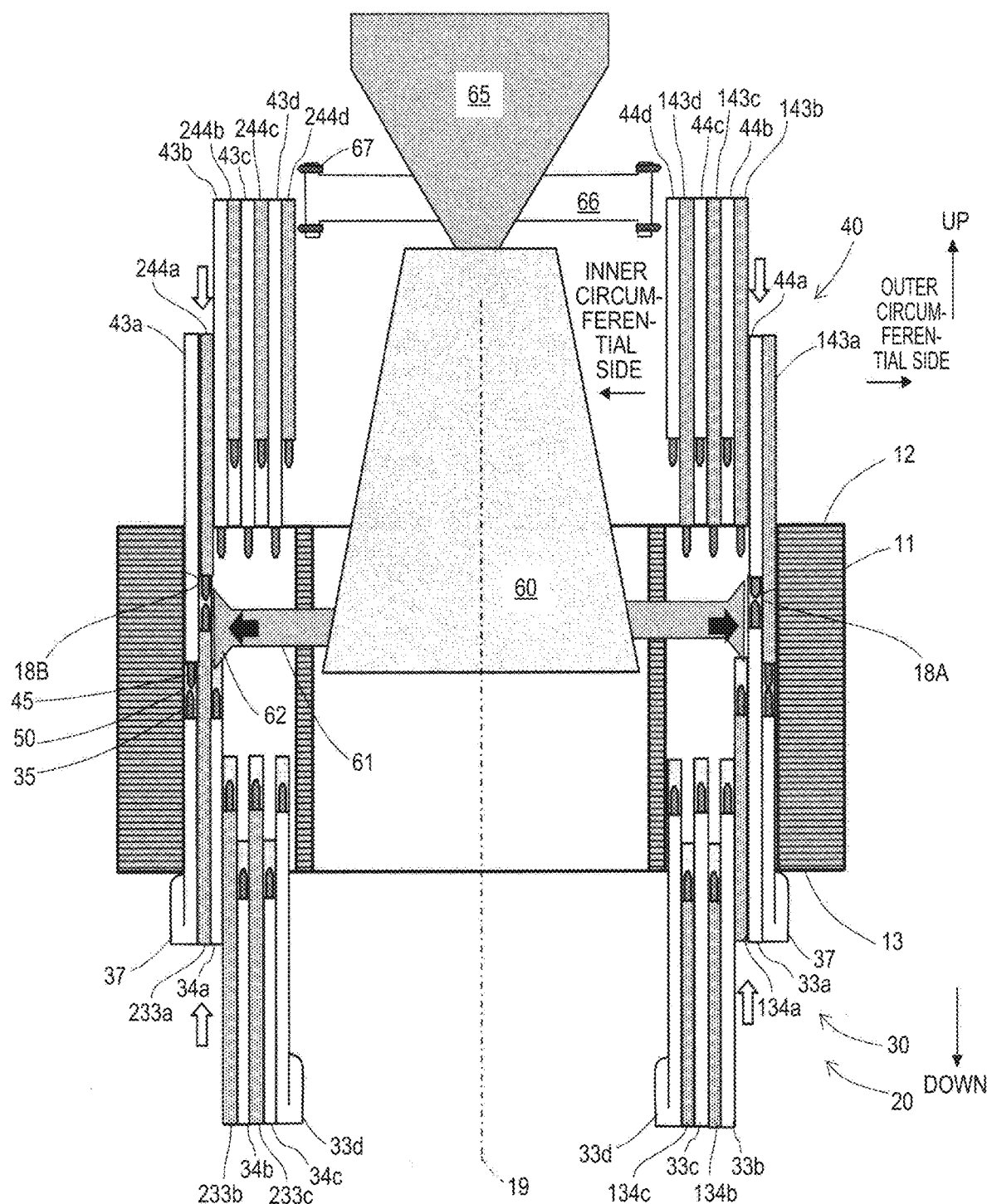
FIG. 16 is a view showing a step in the manufacturing process of the stator coil in which an end portion of the upper conductor segment of the second turn is plugged into the coupling member.

As shown in FIG. 16, the controller adjusts the levels of the arms 61 of the press-in jig 60 in the up-down direction so as to match the positions of the coupling members 50 that respectively connect the short legs 44a, 244a and the long legs 33a, 233a to each other, and then extends the arms 61 toward the radially outer sides to create a clearance for guiding the short legs 44a, 244a of the upper conductor segments 41a, 141a in the axial direction between inner circumferential-side surfaces of the long legs 43a, 143a on the outer circumferential side that have been connected earlier and the leading ends of the arms 61. Then, the controller moves downward the short leg 44a of the upper conductor segment 41a and the short leg 244a of the upper conductor segment 241a from the upper side to plug the leading ends 45 of the short legs 44a, 244a into the coupling members 50. Thus, the likelihood of buckling of the short legs 44a, 244a can be reduced.

Figure 17:
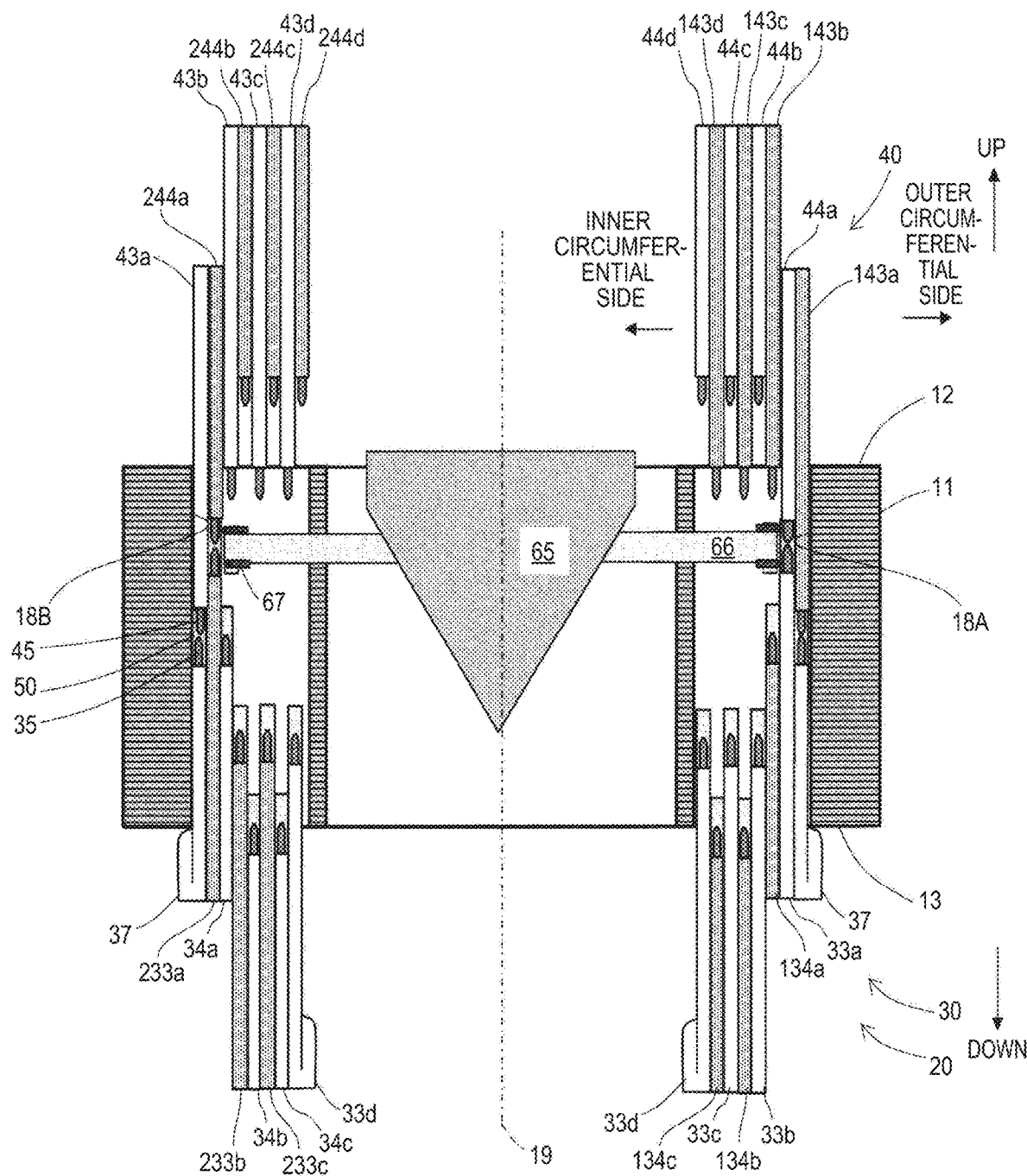
FIG. 17 is a view showing a step in the manufacturing process of the stator coil in which the coupling member of the second turn is swaged by the swaging jig.

As shown in FIG. 17, the controller forms a swaged connection by pressing the outer surfaces of the coupling members 50 by the swaging jig 65 in the same manner as described above (connecting step).

Figure 18:
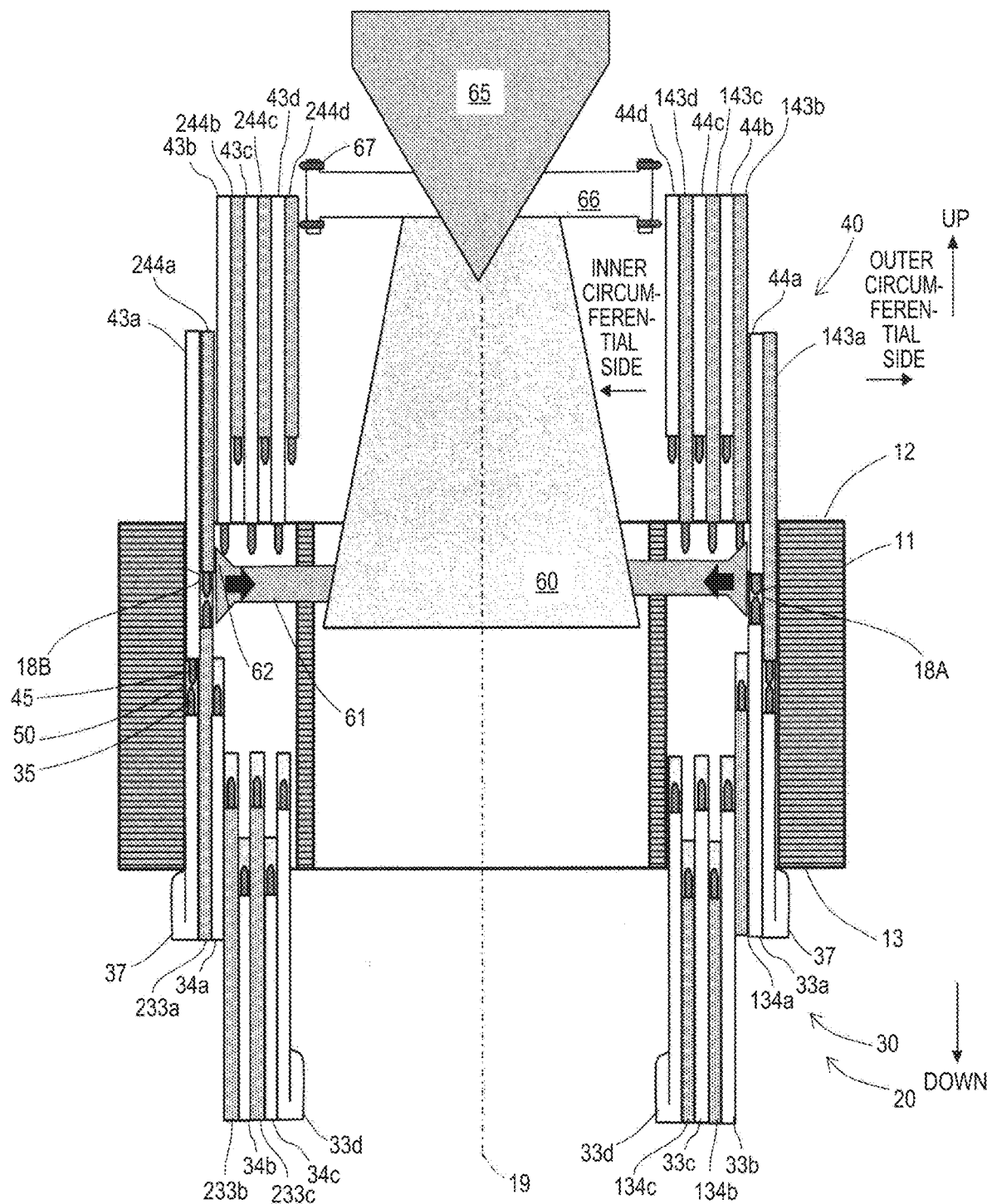
FIG. 18 is a view showing a step in the manufacturing process of the stator coil in which the upper conductor segments of the third to eighth turns are moved toward the inner circumferential side, with the jig catching an end portion of the upper conductor segment of the third turn.

As shown in FIG. 18, the controller moves the upper conductor segments 41b, 141b forming the third turn toward the inner circumferential side, with the hooks 62 at the leading ends of the arms 61 of the press-in jig 60 catching the leading ends 45 of the long legs 43b, 143b of the upper conductor segments 41b, 141b.

Figure 19:
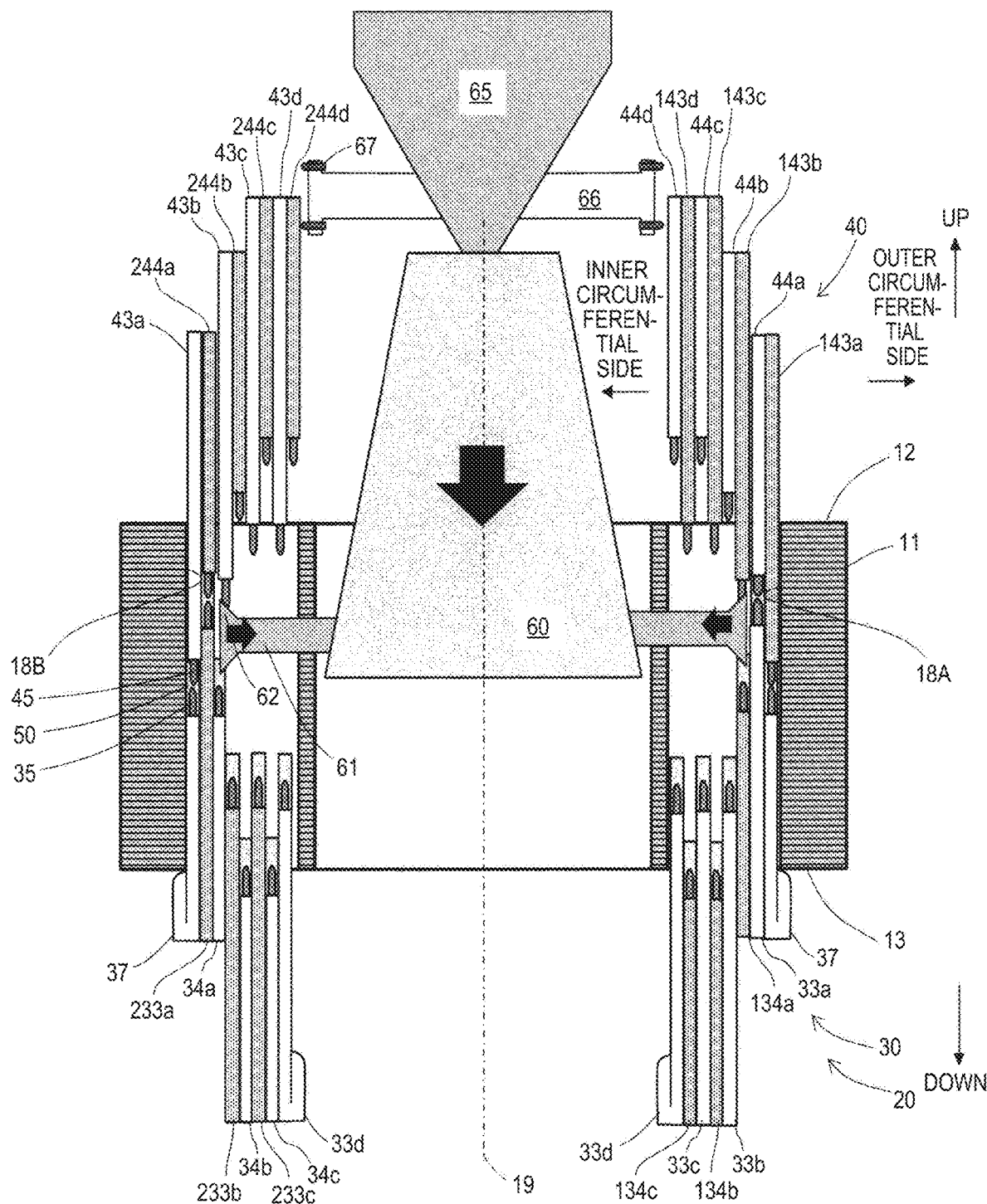
FIG. 19 is a view showing a step in the manufacturing process of the stator coil in which the lower conductor segment of the third turn is pressed in while being moved toward the inner circumferential side, with the jig catching the end portion of the upper conductor segment of the third turn.

As shown in FIG. 19, while maintaining this state, the controller lowers the press-in jig 60 and presses in the upper conductor segments 41b, 141b toward the lower side. In this case, the short legs 44b, 244b of the upper conductor segments 41b, 241b forming the fourth turn move downward along with the upper conductor segments 41b, 141b.

Figure 20:
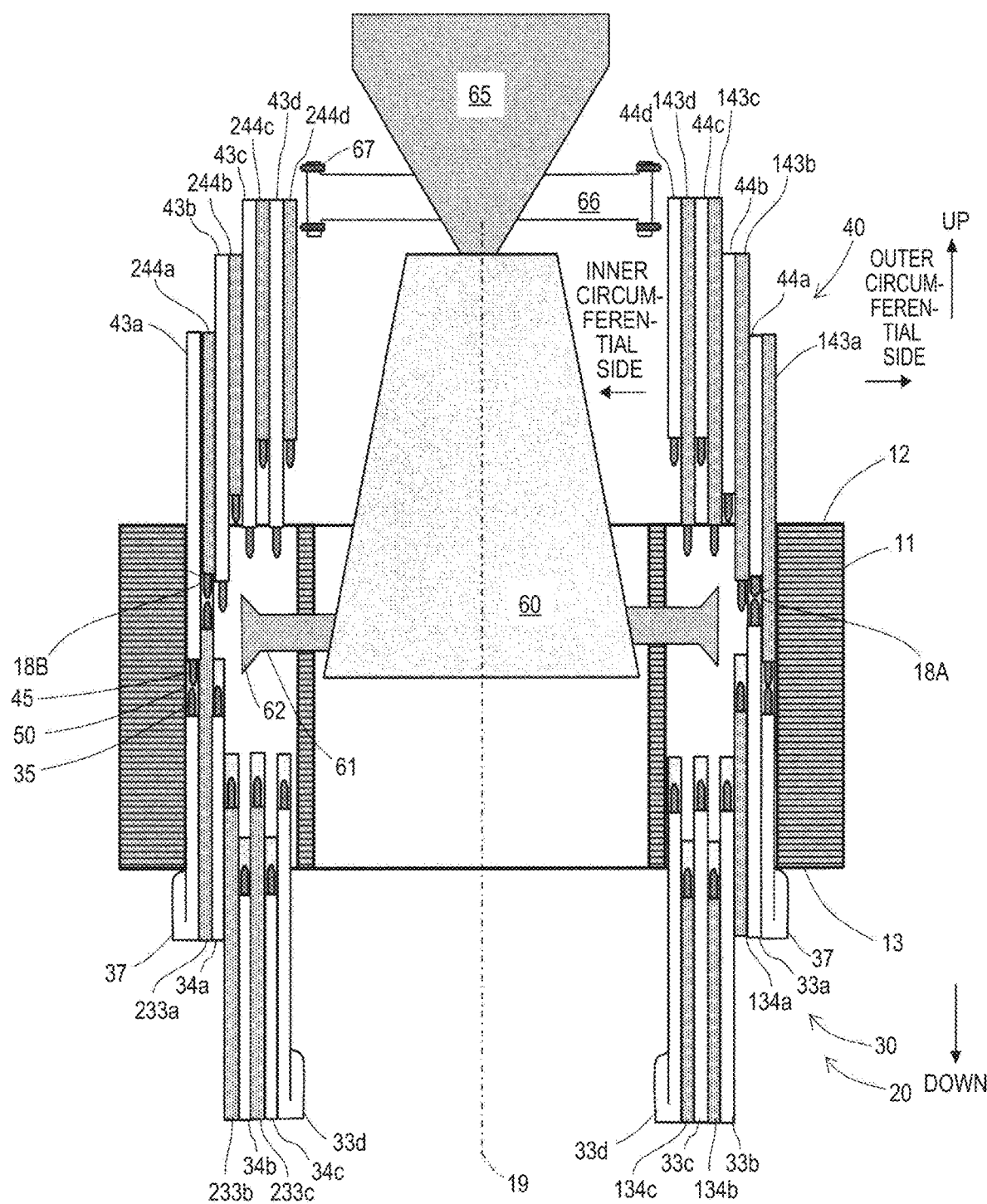
FIG. 20 is a view showing a state where the end portion of the upper conductor segment of the third turn has been plugged to a point below an upper end of the coupling member of the second turn in the manufacturing process of the stator coil.

As shown in FIG. 20, when surfaces of the long legs 43b, 143b of the upper conductor segments 41b, 141b reach a point below the upper ends of the coupling members 50 on the outer circumferential side of the long legs 43b, 143b, the controller shortens the arms 61 of the press-in jig 60. Thus, it is possible to reduce the likelihood that the long legs 43b, 143b of the upper conductor segments 41b, 141b may hit against the end surfaces of the coupling members 50, and to thereby reduce the assembly failure.

Figure 21:
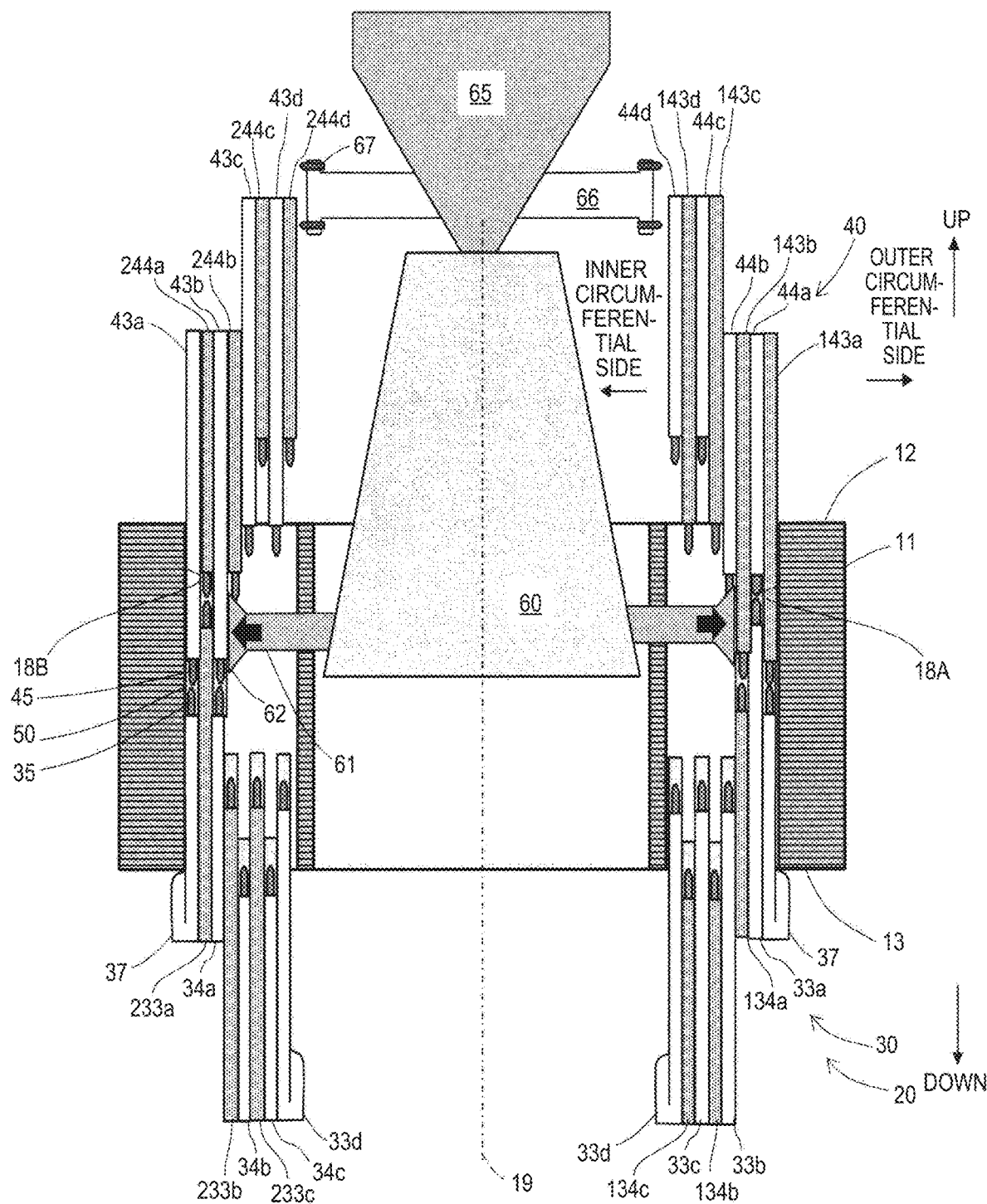
FIG. 21 is a view showing a step in the manufacturing process of the stator coil in which the end portion of the upper conductor segment of the third turn is plugged into the coupling member.
Figure 22:
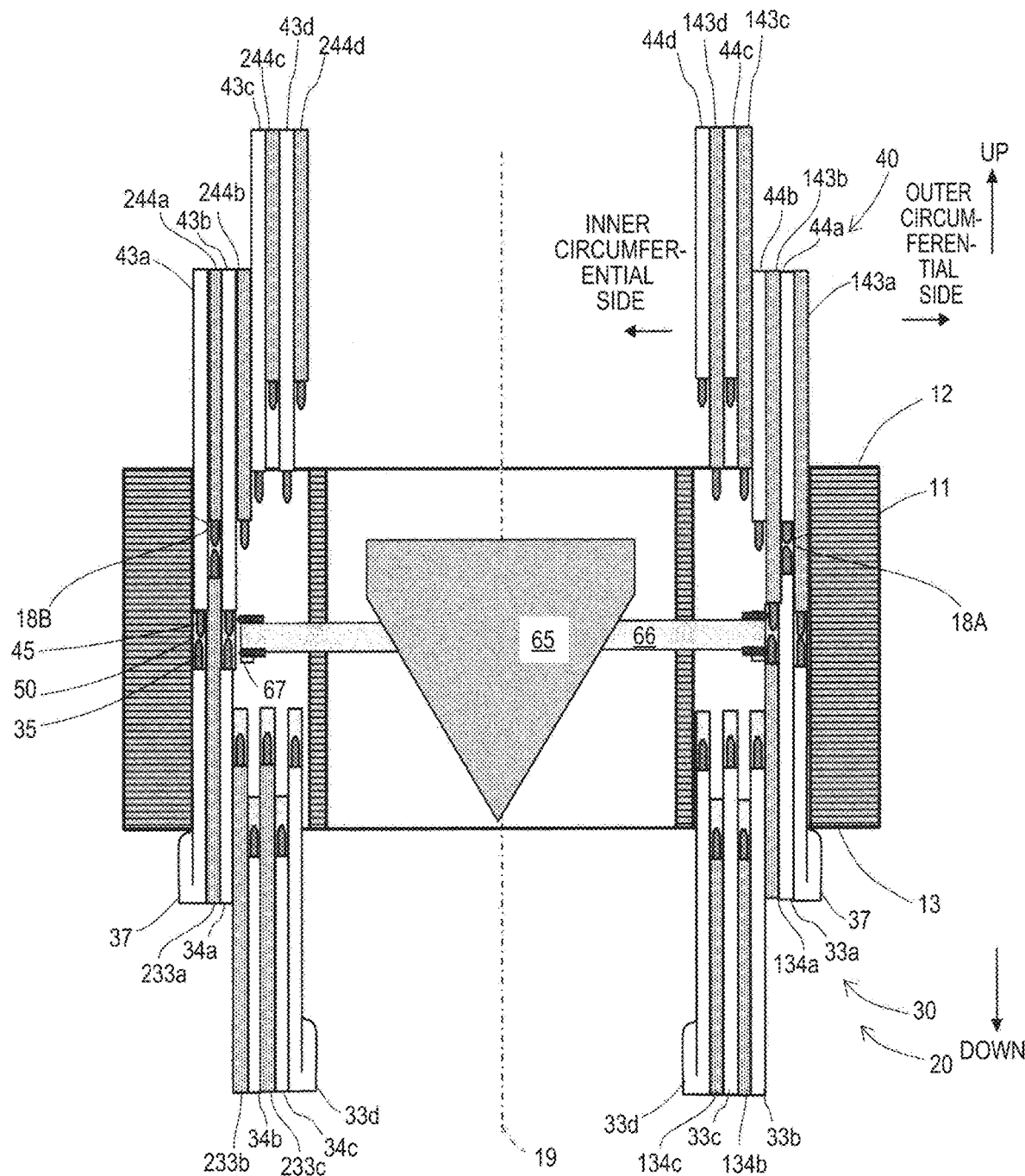
FIG. 22 is a view showing a step in the manufacturing process of the stator coil in which the coupling member of the third turn is swaged by the swaging jig.

As shown in FIG. 21, the controller plugs the long legs 43b, 143b of the upper conductor segments 41b, 141b into the coupling members 50 while guiding the long legs 43b, 143b in the axial direction by the arms 61 of the press-in jig 60 in the same manner as described above, and as shown in FIG. 22, forms a swaged connection and completes the assembly of the third turn.

Figure 23:
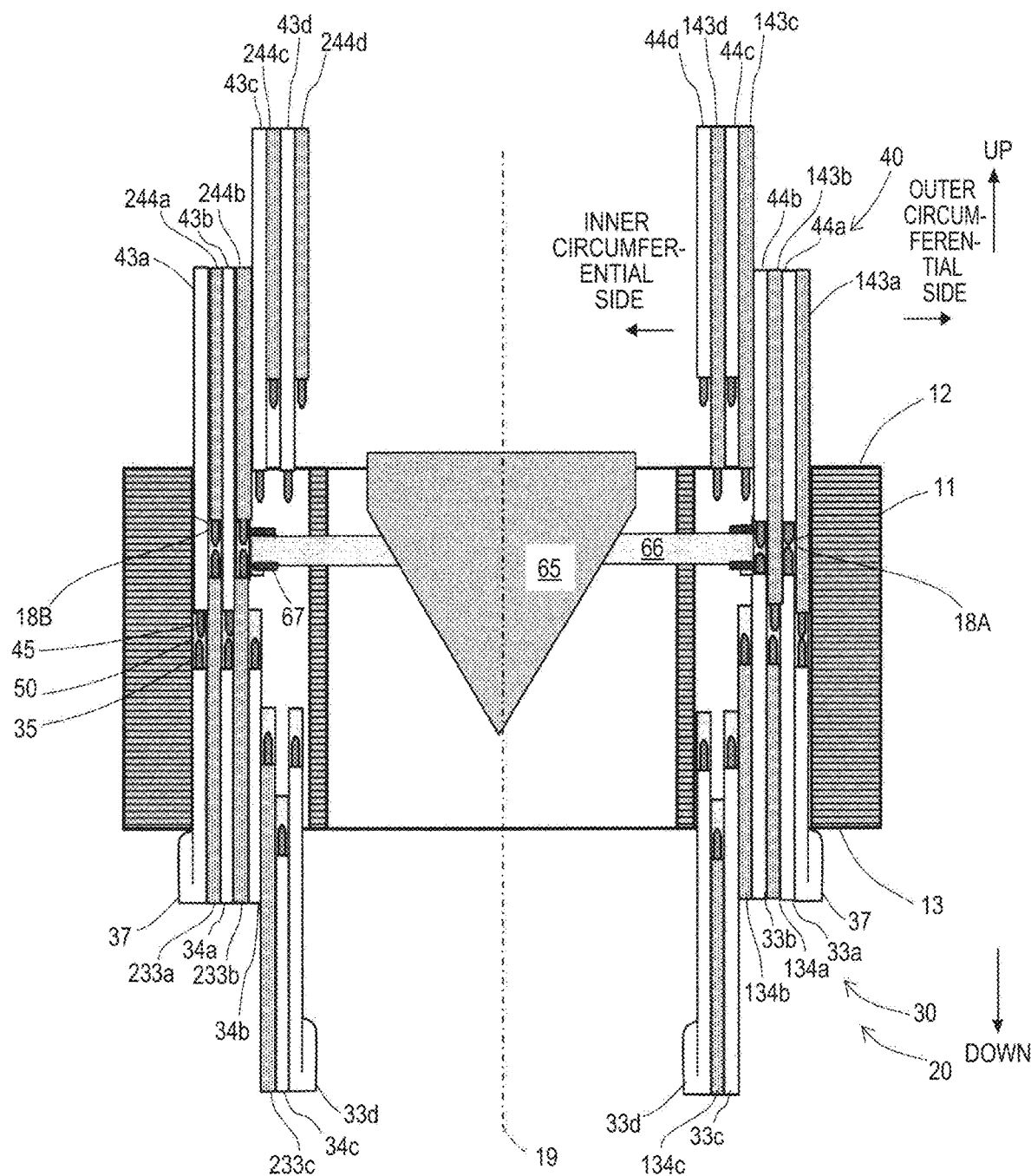
FIG. 23 is a view showing a step in the manufacturing process of the stator coil in which the coupling member of the fourth turn is swaged by the swaging jig.
Figure 24:
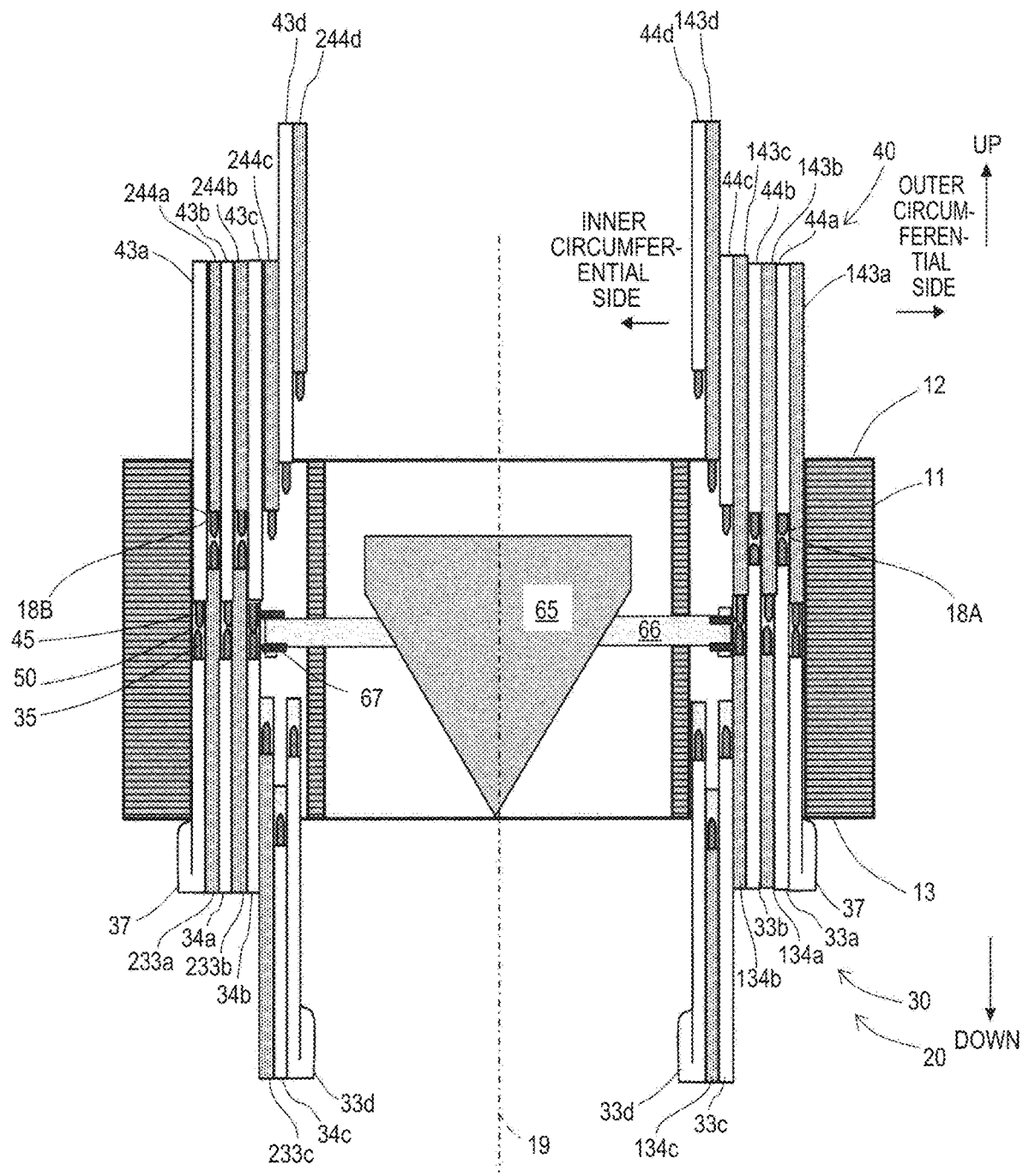
FIG. 24 is a view showing a step in the manufacturing process of the stator coil in which the coupling member of the fifth turn is swaged by the swaging jig.
Figure 25:
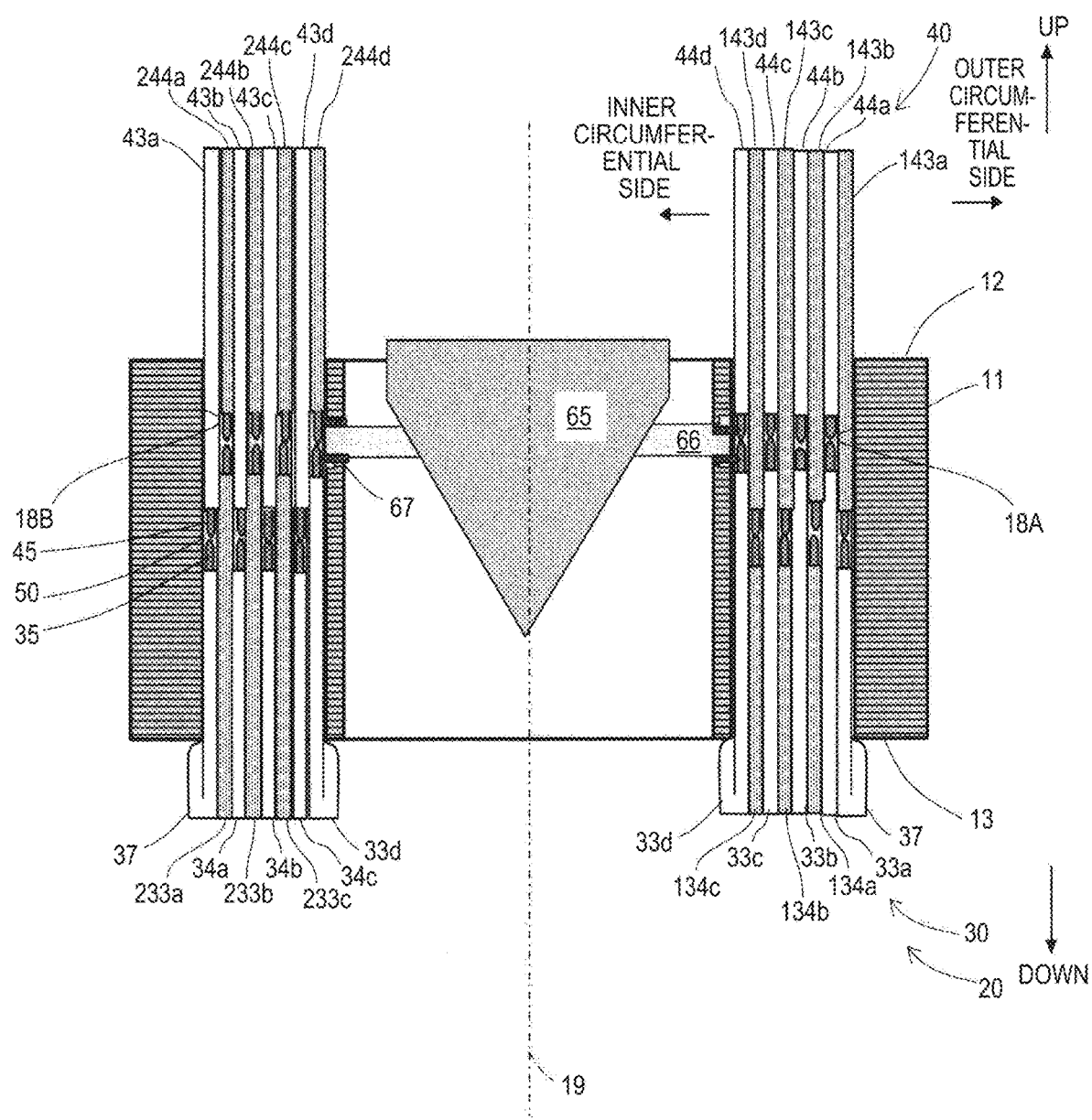
FIG. 25 is a view showing a step in the manufacturing process of the stator coil in which the coupling member of the eighth turn is swaged by the swaging jig.

Subsequently, as shown in FIG. 23 to FIG. 25, the conductor segments 30, 40 forming the fourth, sixth, and eighth turns are assembled by the same method as the assembly of the second turn, and the conductor segments 30, 40 forming the fifth and seventh turns are assembled by the same method as the assembly of the third turn. Thus, the stator coil 20 as shown in FIG. 7 has been completed.

As has been described above, in the manufacturing method for the stator coil 20 of the embodiment, the conductor segments 30, 40 are connected to each other sequentially from the conductor segments 30, 40 on the outer circumferential side, with the conductor segments 30, 40 on the inner circumferential side having been moved toward the inner circumferential side. This can reduce the likelihood that the conductor segments 30, 40 on the outer circumferential side that have already been assembled and the coupling members 50 thereof, and the coupling members 50 mounted at the leading ends 35, 45 of the conductor segments 30, 40 to be assembled on the inner circumferential side of the already assembled conductor segments 30, 40, may hit against each other during the pressing in of the conductor segments 30, 40. As a result, the assembly failure of the conductor segments 30, 40 can be reduced.

In the manufacturing method for the stator coil 20 of the embodiment, the clearances between the leading ends of the arms 61 of the press-in jig 60 and the surfaces of the conductor segments 30, 40 on the outer circumferential side that have already been assembled or the surfaces of the coupling members 50 thereof, or the clearances between the leading ends of the arms 61 and the inner surfaces of the slots 18 can be used to guide in the axial direction the leading ends 35, 45 of the conductor segments 30, 40 on the inner circumferential side to be assembled later or the coupling members 50 thereof and plug the leading ends 35, 45 of these conductor segments 30, 40 into the coupling members 50. This can reduce the likelihood that the coupling members 50 or the leading ends 35, 45 of the conductor segments 30, 40 may buckle while being plugged. As a result, the assembly failure of the conductor segments 30, 40 can be reduced.

In the manufacturing method for the stator coil 20 of the embodiment, the coupling members 50 adjacent to each other in the radial direction are all assembled so as to be staggered in the axial direction. This allows joint portions to be always accessible from the inner circumferential side, without the end portions of the conductor segments 30, 40 being connected becoming covered with the conductor segments 30, 40 on the inner circumferential side that have already been assembled. As a result, the assembly failure of the conductor segments 30, 40 can be reduced.

In the manufacturing method for the stator coil 20 of the embodiment, the coupling members 50 and the leading ends 35, 45 of the conductor segments 30, 40 are connected to each other by swaging. Thus, the connection reliability is improved and the assembly failure of the conductor segments 30, 40 can be reduced.

What is claimed is:

1. A manufacturing method for a stator coil in which end portions of one-side conductor segments that are inserted into slots from a side of one end in an axial direction of a stator core having a plurality of the slots, and end portions of other-side conductor segments that are inserted into the slots from a side of the other end in the axial direction of the stator core, are connected to each other through coupling members inside the slots, the coupling members being mounted either to the end portions of the one-side conductor segments or to the end portions of the other-side conductor segments and inserted into the slots along with the end portions of the one-side conductor segments or the end portions of the other-side conductor segments, the manufacturing method comprising:
partially inserting the one-side conductor segments or the other-side conductor segments into the slots;
after the inserting, pressing in the one-side conductor segment or the other-side conductor segment in an insertion direction in a state where the end portion of the one-side conductor segment or the end portion of the other-side conductor segment, or an end portion of the coupling member has been moved toward an inner circumferential side of the stator core;
after the pressing in, connecting the end portion of the one-side conductor segment and the end portion of the other-side conductor segment to each other through the coupling member; and
executing the pressing in and the connecting sequentially from an outer circumferential side of the stator core.

2. The manufacturing method according to claim 1, wherein:
the pressing in is pressing in the one-side conductor segment or the other-side conductor segment in the insertion direction to a predetermined position; and
the connecting is connecting the end portion of the one-side conductor segment and the end portion of the other-side conductor segment to each other through the coupling member by, after the pressing in, moving the one-side conductor segment or the other-side conductor segment in the insertion direction in a state where the end portion of the one-side conductor segment or the end portion of the other-side conductor segment, or the coupling member is guided by a jig in the axial direction, and plugging the end portion of the one-side conductor segment or the end portion of the other-side conductor segment into the coupling member.

3. The manufacturing method according to claim 1, wherein the connecting is connecting the end portion of the one-side conductor segment and the end portion of the other-side conductor segment to each other such that the coupling member and another coupling member adjacent to the coupling member in a radial direction are staggered in the axial direction.

4. The manufacturing method according to claim 1, wherein the connecting includes forming a swaged connection at the end portion of the one-side conductor segment or the end portion of the other-side conductor segment by pressing the coupling member from the inner circumferential side toward the outer circumferential side of the stator core.

5. The manufacturing method according to claim 1, wherein:
the end portion of the one-side conductor segment and the end portion of the other-side conductor segment have a groove for swaged connection;
the inserting is inserting the end portions of the one-side conductor segments or the end portions of the other-side conductor segments into the slots such that the grooves face the inner circumferential side of the stator core; and
the connecting includes forming the swaged connection by plugging the end portion of the one-side conductor segment or the end portion of the other-side conductor segment into the coupling member and pressing a portion of the coupling member corresponding to a position of the groove from the inner circumferential side toward the outer circumferential side of the stator core so as to fit into the groove.

* * * * *